US011507402B2

(12) United States Patent
Matthew et al.

(10) Patent No.: US 11,507,402 B2
(45) Date of Patent: *Nov. 22, 2022

(54) VIRTUALIZED APPEND-ONLY STORAGE DEVICE

(71) Applicant: Microsoft Technology Licensing, LLC, Redmond, WA (US)

(72) Inventors: Bryan Stephen Matthew, Seattle, WA (US); Scott Chao-Chueh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

This patent is subject to a terminal disclaimer.

(21) Appl. No.: 16/384,769

(22) Filed: Apr. 15, 2019

(65) Prior Publication Data

US 2020/0326970 A1 Oct. 15, 2020

(51) Int. Cl.
*G06F 9/46* (2006.01)
*G06F 9/455* (2018.01)
*G06F 16/18* (2019.01)
*G06F 3/06* (2006.01)

(52) U.S. Cl.
CPC .......... *G06F 9/45558* (2013.01); *G06F 3/067* (2013.01); *G06F 16/1805* (2019.01); *G06F 2009/45591* (2013.01)

(58) Field of Classification Search
CPC .. G06F 16/1805; G06F 16/907; G06F 16/188; G06F 3/0611; G06F 3/0613; G06F 3/0623; G06F 3/0665; G06F 3/067; G06F 2009/45591; G06F 9/45558

USPC ..................................... 718/1, 104; 707/822
See application file for complete search history.

(56) References Cited

U.S. PATENT DOCUMENTS 8,862,810 B2 10/2014 Lee et al.
9,110,594 B2 8/2015 Keeler et al.
9,298,942 B1 3/2016 Millikin
9,304,903 B2 4/2016 Li
(Continued)

OTHER PUBLICATIONS

"Final Office Action Issued in U.S. Appl. No. 15/628,994", dated May 15, 2019, 14 Pages.
(Continued)

*Primary Examiner* — Bradley A Teets
(74) *Attorney, Agent, or Firm* — Han K. Gim; Newport IP, LLC

(57) ABSTRACT

An interface receives storage requests for storing data in a software-defined storage network using an append-only storage scheme. The requests include an identifier of a data object to be stored. The requests are agnostic of hardware-specific details of the storage devices. A virtualization layer accesses space allocation data for the storage devices; and policies for prioritizing performance. Based on the data and policies, a physical storage location at the plurality of storage devices is selected for storing the data object. Metadata is generated for the data object indicating that the data object is an append-only object and mapping the physical storage location of the data object to the identifier. The request is translated to instructions for storing the data object at the physical storage location using the append-only storage scheme. The data object is stored at the physical storage location using the append-only storage scheme.

13 Claims, 12 Drawing Sheets

(56) References Cited

U.S. PATENT DOCUMENTS

| | | | |
|---|---|---|---|
| 2010/0169588 A1 | 7/2010 | Sinclair | |
| 2011/0119462 A1 | 5/2011 | Leach et al. | |
| 2012/0151157 A1 | 6/2012 | Sela et al. | |
| 2013/0173842 A1 | 7/2013 | Ng et al. | |
| 2013/0282955 A1 | 10/2013 | Parker et al. | |
| 2013/0332660 A1* | 12/2013 | Talagala | G06F 12/0246 711/103 |
| 2015/0127607 A1* | 5/2015 | Savage | G06F 16/178 707/610 |
| 2015/0199366 A1* | 7/2015 | Marlatt | G06F 3/0608 707/823 |
| 2016/0266792 A1 | 9/2016 | Amaki et al. | |
| 2016/0330281 A1* | 11/2016 | Narayanan | H04L 67/1095 |
| 2017/0060479 A1 | 3/2017 | Hong et al. | |
| 2018/0336210 A1* | 11/2018 | Bourgeois | G06F 11/1451 |
| 2020/0327099 A1* | 10/2020 | Matthew | G06F 3/0661 |

OTHER PUBLICATIONS

"International Search Report and Written Opinion Issued in PCT Application No. PCT/US19/016940", dated Apr. 26, 2019, 10 Pages.
"Final Office Action Issued in U.S. Appl. No. 15/993,355", dated May 29, 2019, 11 Pages.
"Final Office Action Issued in U.S. Appl. No. 15/993,355", dated Dec. 12, 2019, 11 Pages.
"Non Final Office Action Issued in U.S. Appl. No. 15/628,994", dated Aug. 19, 2019, 15 Pages.
"Non Final Office Action Issued in U.S. Appl. No. 15/993,355", dated Aug. 19, 2019, 11 Pages.
Adhikari, et al., "A Hybrid Architecture for Secure Management of Manufacturing Data in Industry 4.0", In Proceedings of IEEE International Conference on Pervasive Computing and Communications Workshops, Mar. 11, 2019, pp. 973-978.
"International Search Report and Written Opinion Issued in PCT Application No. PCT/US20/025626", dated Jul. 31, 2020, 17 Pages.
Winter, et al., "Deploying WORM Storage in the Public Cloud: AWS, Azure, GCP", Retrieved From: https://cloud.netapp.com/blog/deploying-worm-storage-in-the-public-cloud-aws-azure-gcp, Apr. 2, 2019, pp. 1-5.
Min, et al., "SFS: Random Write Considered Harmful in Solid State Drives", In Proceedings of the 10th USENIX Conference on File and Storage Technologies, February 14, 2012, 16 Pages.
"Write amplification—Wikipedia", Retrieved from: https://en.wikipedia.org/w/index.php?title=Write_amplification&oldid=754352450, Dec. 12, 2016, 13 Pages.
"Non Final Office Action Issued in U.S. Appl. No. 15/628,994", dated Nov. 21, 2018, 16 Pages.
"Non Final Office Action Issued in U.S. Appl. No. 15/898,083", dated Nov. 19, 2018, 9 Pages.
"Non Final Office Action Issued in U.S. Appl. No. 15/993,355", dated Nov. 21, 2018, 11 Pages.
Huen, et al., "Performance And Endurance Enhancements with Multi-Strearn SSDS on Apache Cassandra", Retrieved From: http://www.samsung.com/us/labs/collateral/index.html, Jan. 25, 2017, 11 Pages.
"International Search Report and Written Opinion Issued in PCT Application No. PCT/US18/016937", dated Apr. 5, 2018, 11 Pages.
Yang, et al., "AutoStream: Automatic Stream Management for Multi-Streamed SSDs", In Proceedings of the 10th ACM International Systems and Storage Conference, May 22, 2017, 11 Pages.
"Final Office Action Issued in U.S. Appl. No. 15/628,994", dated Mar. 6, 2020, 12 Pages.
"Office Action Issued in European Patent Application No. 18706353.2", dated Jun. 25, 2021, 7 Pages.
"Office Action Issued in European Patent Application No. 18706353.2", dated Mar. 1, 2021, 7 Pages.
"Office Action Issued in European Patent Application No. 18706353.2", dated Oct. 21, 2021, 8 Pages.
"Office Action Issued in European Patent Application No. 19708375.1", dated Mar. 31, 2022, 6 Pages.
"Office Action Issued in European Patent Application No. 18706353.2", dated Feb. 18, 2022, 12 Pages.
"Office Action Issued in Indian Patent Application No. 201947031014", dated Jan. 7, 2022, 6 Pages.

\* cited by examiner

VIRTUALIZED APPEND-ONLY STORAGE DEVICE

BACKGROUND

A host system such as a computer or a server may be configured to interact with a file system to perform operations in association with stored files (e.g., open a file, delete a file, write to a file, read from a file, replace a file, copy a file, move a file, search for a file, create a file, etc.). The file system is used to control how files and data are stored and retrieved on the system. There are a variety of different file systems for use with different applications or operating systems. File systems can be used with different types of storage devices that use different kinds of media, such as hard disk drives, SSDs, optical discs, and storage-class memory (SCM). The physical layer of the file system may interact directly with the physical device.

It is with respect to these and other considerations that the disclosure made herein is presented.

SUMMARY

In an append-only storage system, new data or files are serially added to the storage system at the next available block which may be indicated by a specified offset. New data or files are continuously added without updating or overwriting previously stored records or files. In general, written data need not be modified. The last committed transaction may be tracked to maintain a record of the end of the current file, and pointers to locations in the file where the data is stored are also maintained. An append-only system thus allows for simpler file management overhead, but does not allow for changes to previously stored records or files or deletions of previously stored records. One problem is that user interfaces are not well suited for append-only storage services, requiring the user to select locations and offsets that may be inefficient for the user's data as well as for the service provider. Inputting of such values may be difficult for users to determine.

Virtualization is one example of a technology that may be used to abstract details of the underlying storage devices. Virtualization, for example, enables the creation of a fully configured computer or storage system based entirely on a software implementation. For example, when a guest computer system is emulated on a host computer system, the guest computer system is said to be a "virtual machine" as the guest computer system exists in the host computer system as a software representation of the operation of one specific hardware architecture. Virtual machines may also use virtualized storage resources, which may be abstractions of actual storage devices which may include various storage technologies as discussed herein.

At least some embodiments of this disclosure are directed to a user interface for a file system that provides a virtualized append-only storage service. The user interface may be configured to abstract details of the underlying physical storage systems from the user perspective. In some embodiments, the append-only storage service may be optimized for the available physical storage devices. Append only services may be provided and optimized using a variety of storage devices, while hiding the physical details from the user, for example by abstracting the allocation of appends on the physical storage device from the host.

In one embodiment, a user interface is configured to facilitate user access to a cloud-based append-only storage service. The append-only interface is abstracted and generalized, and thus the user need not be concerned with the underlying hardware. The user interface is configured to abstract the details of the underlying storage devices, including the locations and offsets where the data is to be stored. The user interface may facilitate append-only storage for a plurality of data types such as s blob, log, stream, queue, table, or other data type.

In another aspect, the interface abstracts the underlying hardware such that an append-only service may be implemented regardless of whether the underlying hardware is an append-only device or a random-access device or another device capable of providing storage. By providing a virtualized append-only service, append-only functionality can be provided to users regardless of where the data is actually stored and the specific device where the data is stored.

In an embodiment, the size of the appended data may grow arbitrarily. As long as the user continues to add data, there may be no limit as to the amount of data that can be appended. In some embodiments, the append interface allows for an allocation of storage space to be limited to a maximum size. Once the maximum has been reached, any new data writes may be wrapped so that the oldest data are overwritten with newer data. In another embodiment, the append interface may allow for a trimming function that reduces the size of the append stream by trimming the stored data according to criteria, such as trimming the oldest data or the lowest priority data. The data may also be trimmed by undoing data writes based on the most recent data writes, or all data writes since a specified time.

For example, the underlying device need not be an append device. In an embodiment, a storage stack can be implemented that can simulate what the append interface looks like and simulate an append device, presenting the simulated interface to the user. Because the details of the underlying storage device are abstracted from the append-only user, the storage stack may store the user's data in a way that provides virtualized append-only storage services in accordance with the user's service level agreement, while allowing the underlying hardware to be used in a way that can provide advantages to the service provider while reducing operational cost. For example, the service provider may store the data so as to maximize throughput and allow for fast write commitments as a priority over fast retrievals, while adhering to the user's service level agreement.

In another aspect, an append-only storage virtualization system is disclosed that abstracts details of underlying storage devices, enabling append-only services on top of both append-only and random-access storage devices. The append-only storage virtualization system includes an abstraction layer that enables an append-only storage service that is capable of running on both append-only and random-access devices. In such a virtualized append-only storage service, the abstraction of the underlying storage devices enables the service provider to optimize services to the clients, as well as enabling the service provider to increase operational efficiencies by balancing the usage of specific storage devices. Append requests may be translated into optimal writes/commits based on the available underlying devices of the storage service.

When providing append-only storage services, the service provider may incorporate append-only storage devices. Service providers may maintain an inventory of such devices and anticipate the capacity required to provide the services to their users. Management of these devices may result in an inefficient use of resources when capacity does not meet demand or exceeds actual demand. The disclosure thus provides a way to translate append-only requests to writes that are optimized for the underlying devices. An underlying device need not be an append device. For example, data may be stored using an append-only framework on a random-access device. Additionally, random-access data may be stored on an append-only device. For example, random-access data can be serialized and posted to an append-only device.

The disclosure provides a way to translate append-only storage requests into optimal writes/commits to underlying storage devices regardless of the type of the storage device. For example, the file system or the virtualization system may include functionality to translate I/O requests and optimize how the append-only storage requests are executed to balance service level agreements and operational efficiencies and priorities for the storage system. Because the details of the underlying storage device are abstracted from the append-only user, the storage stack may store the data so as to maximize throughput and allow for fast write commitments as a priority over fast retrievals. In this way, the I/O operations may be optimized for quality of service while achieving cost savings by using the append device or random-access devices as needed.

By abstracting the underlying storage devices and optimization storage requests, a service-oriented charging model may be implemented for storage services. Different classes of service may be provided that are better matched to specific application needs. For certain data types such as blobs, charges for operations such as puts and gets may consider whether the storage is append-only. In one example, a standard append service or a premium SSD-type service can be provided. The append service enables a storage service with strict append-only semantics. Once saved, a user may only access the data or invalidate it, but otherwise is not able to edit the data.

Abstraction of the append-only services allows data centers to optimize storage allocations and balance capabilities between regions. For example, one data center may have available append-only devices, while another region may not have any append only devices. Storage loads can be shifted between data centers if performance commitments can be met. Additionally, virtualized append-only services can be provided using non-append devices.

Individual blobs can be tagged with metadata that defines whether the blob is to be stored as a random-access object or an append-only object. The file system or the virtualization system can enforce the tagged capabilities of each blob. The file system or the virtualization system can also convert the type of storage associated with each blob, for example changing the storage type from append-only to random-access. This capability may be useful if a user requests archival storage using append-only services, but later decides that they need full access services. The data center can then remove the append-only restriction and provide full access services for the user's stored objects. Advantageously, the data may not need to be moved if the data was stored as an append-only object but physically stored on a full access device. The system can leave the data where it is stored and update the metadata to indicate that the data is now full access.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

The following Detailed Description describes technologies that enable implementation of an interface for providing an append-only storage service that abstracts hardware-specific details of the underlying storage devices. An append-only storage system is one where data writes are serially appended to the end of the storage area. In general, previously written data can be accessed but is not modified. The last committed transaction is tracked to maintain the end of the current storage area, and pointers to locations in the storage area where the data is stored is also maintained. For example, in an append-only storage system new data or files may be serially added to the storage system at the next available block at a specified offset. New data or files are added without updating or overwriting previously stored data or files. The last committed transaction may be used to determine the next write location. Append only systems can avoid write contention or dependency among locked data entries. Furthermore, previously written data need not be overwritten, and read operations can be performed independently of write operations. An append-only system thus allows for simpler file management overhead, but does not allow for changes to previously stored data or files. In some implementations, an append-only system does not allow for deletions of previously stored data.

Figure 1:
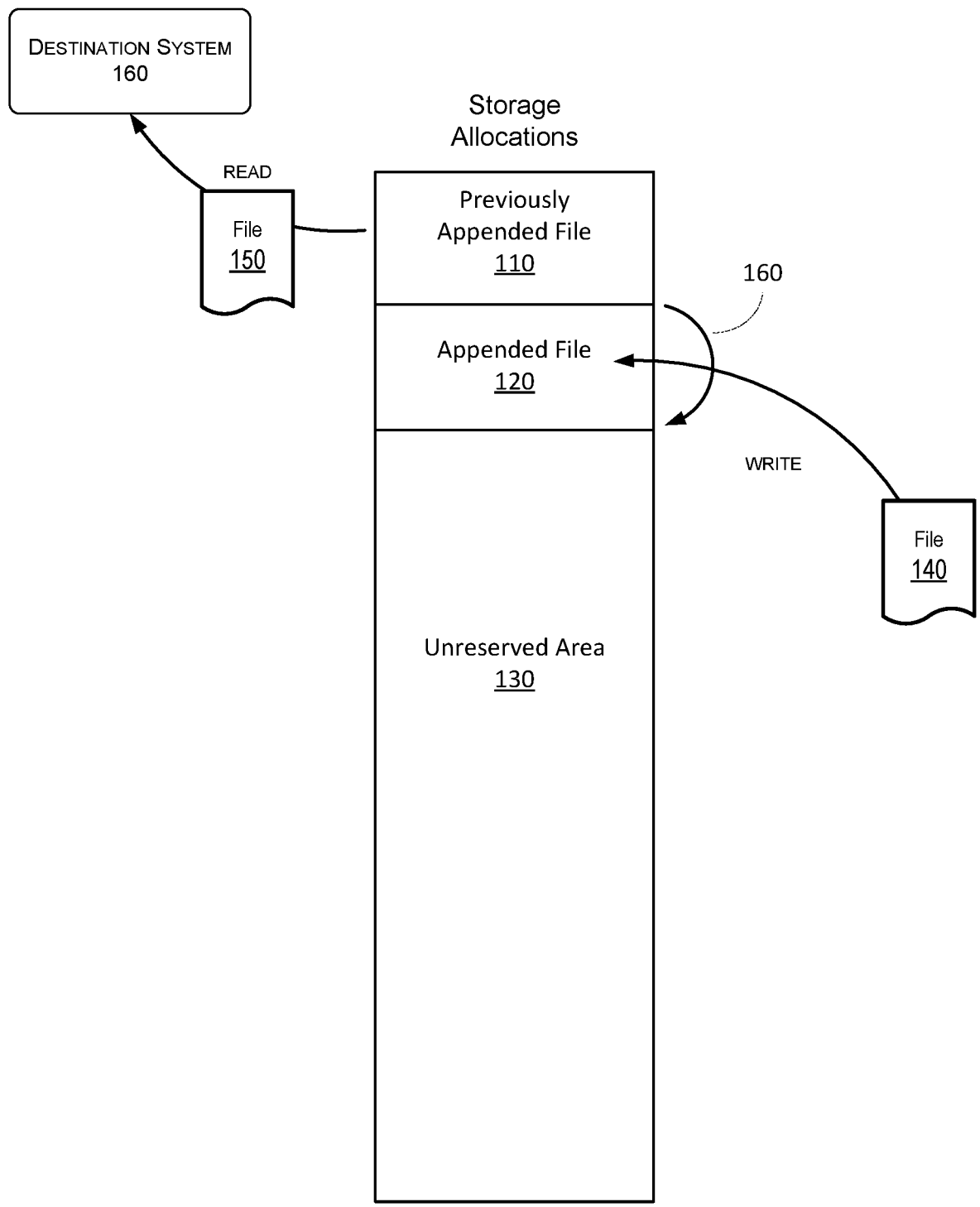
FIG. 1 is an example diagram depicting an append only file system.

FIG. 1 illustrates an example of an append-only storage system. A storage area 100 includes a previously append file 110. A file 140 is to be written to storage area 100. The file 140 is appended at a current offset which is moved to indicate a new offset 170 after the file 140 is appended. The unreserved area 130 indicates additional unallocated storage space for future append operations. Previously appended file 110 may be read via a request for file 150 by destination system 160. In some embodiments, read requests can be made independently of write requests.

One problem is that user interfaces are not well suited for append-only storage services, requiring the user to select locations and offsets that may be inefficient for the user's data as well as for the service provider. User interfaces for append-only systems typically require inputs such as the offset value or other inputs that require knowledge of the underlying hardware. Inputting of such values may be difficult for users to determine, and custom interfaces may need to be generated for each type of storage device.

Various embodiments are disclosed for implementing an interface for providing an append-only storage service that abstracts hardware-specific details. The interface abstracts the underlying hardware such that an append-only service may be implemented regardless of whether the underlying hardware is an append-only device or a random-access device or another device capable of providing storage. By providing a virtualized append-only service, append-only functionality can be provided to users regardless of where the data is actually stored and the specific device where the data is stored.

Figure 2:
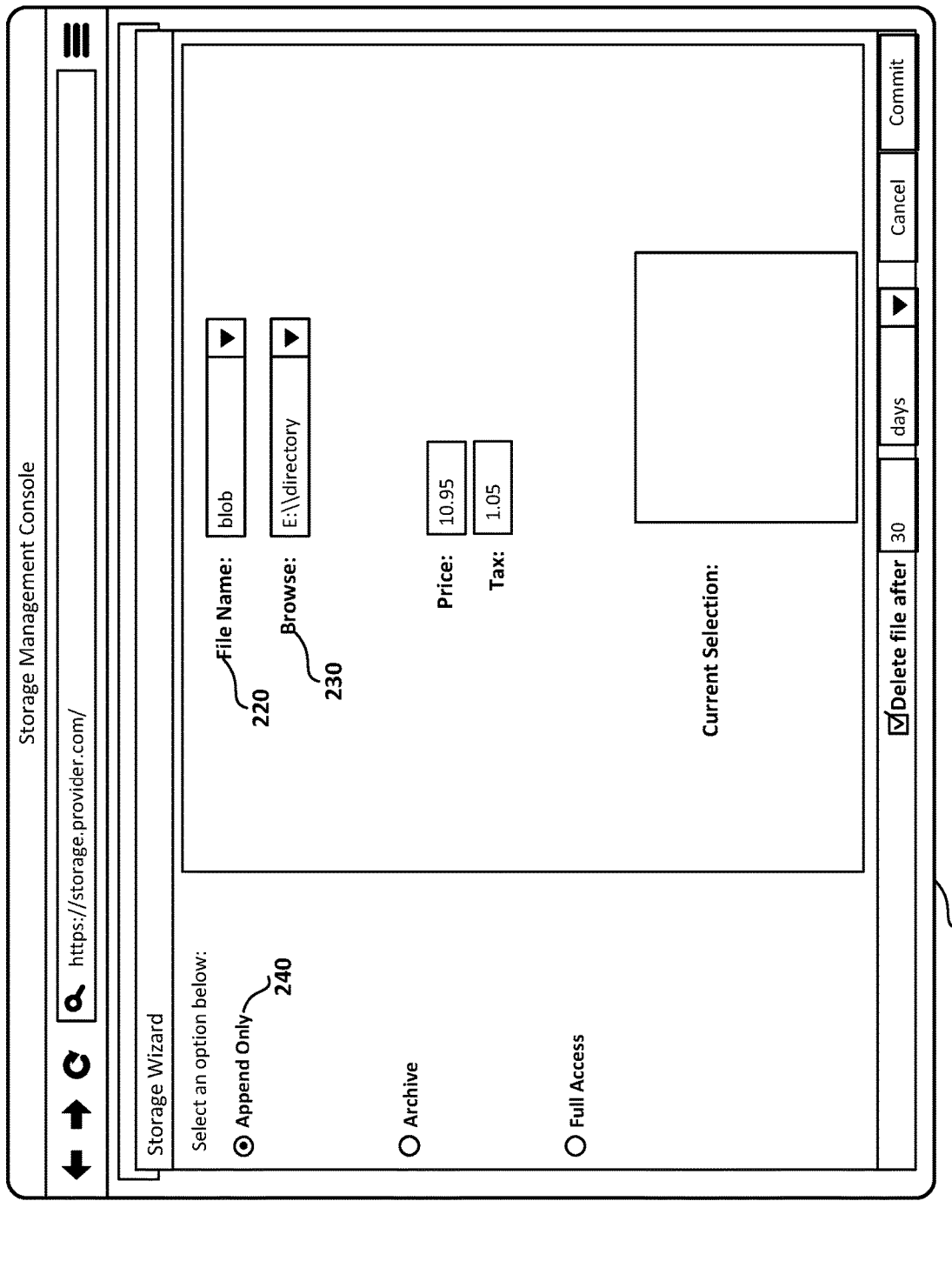
FIG. 2 is an example diagram depicting an example user interface in accordance with the present disclosure.

The disclosed technologies represent a substantial advantage over existing file systems which are not configured to abstract details of an append only storage service. In one embodiment, the disclosure describes a user interface configured to facilitate user access to a cloud-based append-only storage service. The append-only interface is abstracted, and thus the user need not be concerned with the underlying hardware. The user interface is configured to abstract the details of the underlying storage devices, including the locations and offsets where the data is to be stored. The interface facilitates append-only storage for a plurality of data types such as s blob, log, stream, queue, table, or other data type. FIG. 2 illustrates an example of a user interface 200 where an append-only interface is 210 is rendered. The interface 210 allows a user to specify a file to be stored 220 and a storage area 230. The user may also specify whether the file is to be stored 240 as a full access file, an append only file, or an archive file. In one embodiment, the user may specify the append only data buffer where the data should be written. The type of file need not be specified, as any type of file may be appended. In an embodiment, the user may delete a previously appended blob, but cannot otherwise modify an appended file.

In an embodiment, the amount of space to be allocated for the appended data may not be specified, and the size of the appended data may grow arbitrarily. As long as the user continues to add data, there may be no specified limit as to the amount of data that can be appended.

In some embodiments, the append interface may allow for an allocation of storage space to be limited to a maximum size. In one embodiment, once the maximum allocation has been reached, any new data writes may be wrapped so that the oldest data are replaced with newer data. In another embodiment, new data writes may not be allowed until some of the stored data is deleted, or until a larger storage size is allocated to the user.

In some embodiments, the append interface may allow for a trimming function that reduces the size of the appended data by trimming the stored data according to criteria. In one embodiment, the oldest data may be trimmed up to a specified amount or up to a specified date/time that the data was stored. In another embodiment, the lowest priority data may be trimmed. In this implementation, the priority for each data write may be selectable and stored with the data's metadata. When the trimming function is activated, the data that is tagged or otherwise associated with a lower priority may be selected for trimming. The data may also be trimmed by undoing data writes based on the most recent data writes, or all data writes since a specified time.

Figure 3:
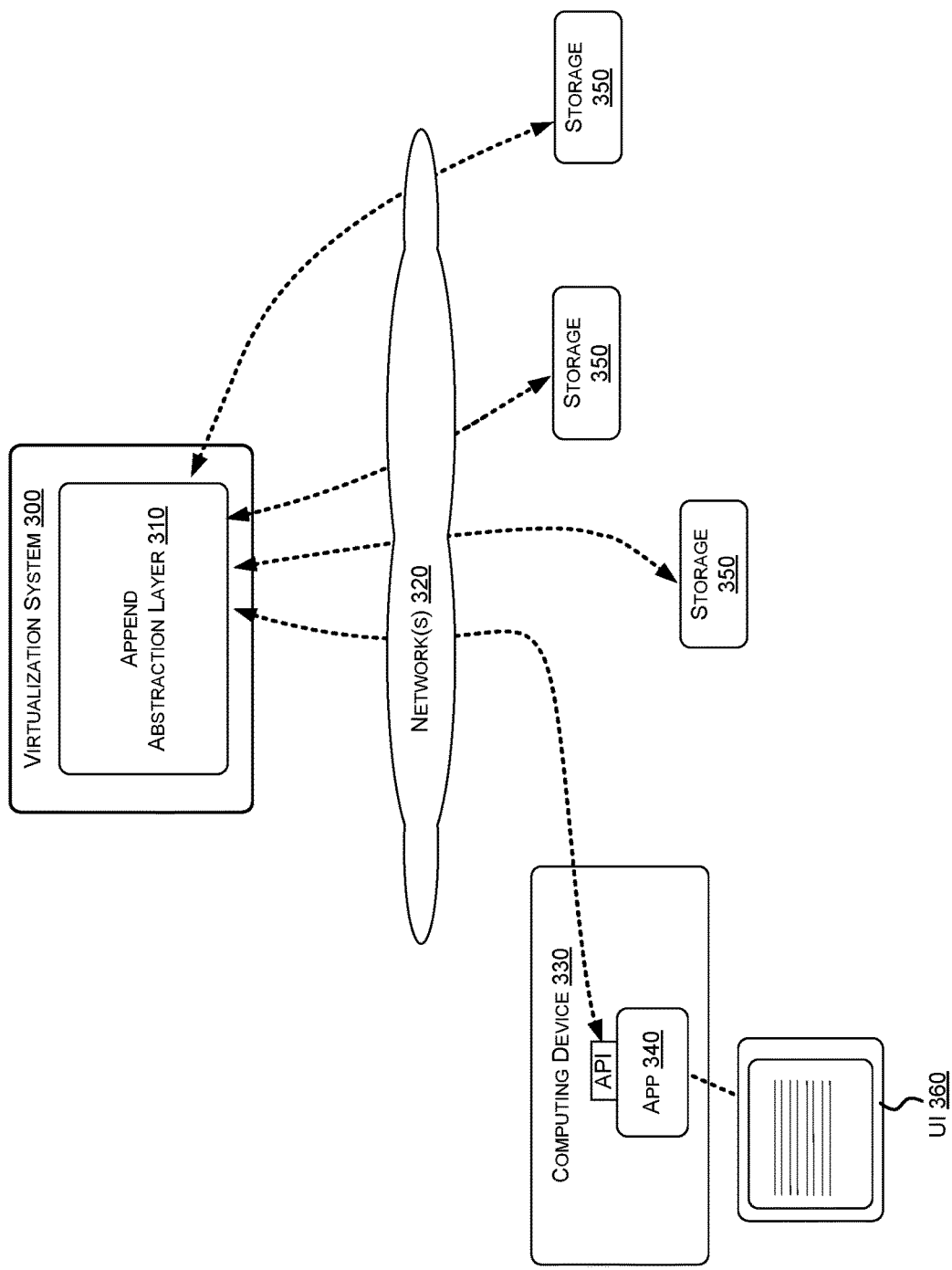
FIG. 3 is an example diagram depicting a system implementing aspects of the present disclosure.

In the example illustrated in FIG. 3a, the allocation of storage space for append area 375 is limited to a maximum size 376. In one embodiment, once the maximum size 376 has been reached, new data is appended 371 by wrapping 370 the oldest data 372 so that the oldest data 372 is deleted and newer data 374 is appended. In one implementation, the metadata for the allocation table for append area 375 may be updated to indicate that the addresses associated with the oldest data 372 are not allocated, and further updating the addresses table to indicate the addresses for the new data 374.

Continuing with FIG. 3a, a trimming function is executed on append area 385 to reduce the size of the appended data by trimming the oldest data 380 according to criteria. In one example, the data may be trimmed by undoing data writes since a specified time. In one implementation, the allocation table for append area 385 may be updated to indicate that the addresses associated with the oldest data 382 are not allocated, and further updating the addresses table to indicate the addresses for the new data 384.

The underlying device need not strictly be an append device. A storage stack can be implemented that can provide an abstracted append interface that simulates a virtualized append storage device. Because the details of the underlying storage device are abstracted from the append-only user, the storage stack may store the data so as to maximize throughput and allow for fast write commitments as a priority over fast retrievals.

In the example shown in FIG. 3B, a storage virtualization system 300 is illustrated that implements an append abstraction layer 310. The append abstraction layer 310 may be configured to manage virtualized storage services on various underlying storage devices 350 over a network 320. An append only user interface 360 may be provided on a user computing device 330. The user interface 360 may be provided in conjunction with an application 340 that communicates to the append abstraction layer 310 using an API via network 320. In some embodiments, an append-only storage virtualization system such as virtualization system 300 may be configured to abstract details of the underlying storage devices 350, enabling append-only services to be provided on top of append-only, random-access storage devices, and other types of storage devices.

When a storage service provider offers append-only storage services, the provider may incorporate append-only storage devices in their data centers. The service providers may maintain an inventory of such devices and anticipate the capacity required to provide the services to their users. Management of these devices may result in an inefficient use of resources when capacity does not meet demand or exceeds actual demand.

By providing a virtualized append-only service, append-only functionality can be provided to users regardless of where the data is actually stored and the specific device where the data is stored. In another aspect, in a virtualized append-only storage service, the abstraction of the underlying storage devices enables the service provider to optimize storage services provided to users, as well as enabling the service provider to increase operational efficiencies by balancing the usage of specific storage devices. For example, append storage requests may be translated into optimal writes/commits based on the available underlying devices of the storage service. For example, in a shingled magnetic recording (SMR) drive only appends are allowed, with strict write ordering split into zones. The virtualized append-only service may translate I/O requests to work with the SMR semantics while abstracting the details from the user. As another example, an SSD may be used with zoned namespaces, where data can only be appended to the end of the current zone. The virtualized append-only service may manage the use of zones and hide the specification of zones from the user. Alternatively, the zone layout of a particular device may be abstracted to logical zones that can be presented to the user. The virtualized append-only service may translate the logical zones to the actual physical zones of the particular devices.

By abstracting the underlying storage devices and optimization storage requests, a service-oriented charging model may be implemented for storage services. Different classes of service may be provided that are better matched to specific application needs. For certain data types such as blobs, charges for operations such as puts and gets may consider whether the storage is append-only. In one example, a standard append service may be provided where a user can specify data to store using strict append-only semantics in an append-only format. The standard append service may include a period of time for the storage, and the user may be limited to accessing the stored data or deleting the stored data, but not modifying the stored data. The standard append service may be provided at a first price. A premium random-access storage service may also be provided, where the user may specify data to store using full access read/write semantics. The premium random-access storage service may include a period of time for the storage, and the user may be provided full read/write/modify/delete access to the stored data. The premium random-access storage service may be provided at a second price.

In an embodiment, a storage stack can be implemented that can simulate what the append interface looks like and simulate an append device. Additionally, the storage stack can simulate a random-access storage service that is virtualized and can be stored on an underlying append-only device. For example, random-access data can be serialized and posted to an append device. By virtualizing both random-access and append-only storage schemes, the storage service provider may provide a plurality of storage services over a plurality of storage devices and device types, enabling flexibility in service offerings while at the same time enabling flexibility with regard to device usage and management.

The disclosed embodiments thus provide a way to translate append-only storage requests into optimal writes/commits to underlying storage devices regardless of the type of the storage device. For example, the file system or the virtualization system may include functionality to translate I/O requests and optimize how the append-only storage requests are executed to balance service level agreements and operational efficiencies and priorities for the storage system. Because the details of the underlying storage device are abstracted from the append-only user, the storage stack may store the data so as to maximize throughput and allow for fast write commitments as a priority over fast retrievals. In this way, the I/O operations may be optimized for quality of service while achieving cost savings by using the append device or random-access devices as needed.

Abstraction of the append-only services allows data centers to provide levels of service regardless of where the data is actually stored. Abstraction of the append-only services further allows data centers to optimize storage allocations and balance capabilities between regions. For example, one data center may have available append-only devices, while another region may not have any append only devices. Storage loads can be shifted between data centers if performance commitments can be met. Additionally, virtualized append-only services can be provided using non-append devices.

Individual blobs can be tagged with metadata that defines whether the blob is to be stored as a random-access object or an append-only object. The file system or the virtualization system can enforce the tagged capabilities of each blob. The file system or the virtualization system can also convert the type of storage associated with each blob, for example changing the storage type from append-only to random-access. This capability may be useful if a user requests archival storage using append-only services, but later decides that they need full access services. The data center can then remove the append-only restriction and provide full access services for the user's stored objects. Advantageously, the data may not need to be moved if the data was stored as an append-only object but physically stored on a full access device. The system can leave the data where it is stored and update the metadata to indicate that the data is now full access.

Host devices typically interact with storage devices based on logical block address (LBA) mappings to read/write data. File systems may maintain metadata to present application/user-friendly access points such as files which may be accessed by file name/ID & an offset. When reading/writing to or from a block-addressed device, the host may specify a LBA mapping (e.g., a starting block and length). When reading/writing to or from a device, the host may specify an ID and optionally an offset and length.

When storing a file or data at a storage device using an append-only scheme, a file system or virtualization system may determine an amount of storage capacity required to store the file or data on a device. The device may be, for example, a solid state device, such as an SSD Determining an amount of storage capacity required to store data on the device may comprise determining a number of blocks of the solid state device required to store the data. In one embodiment, a block may be the smallest unit of the SSD that is capable of being erased. The file system or virtualization system may determine the number of blocks needed to store the data based on the amount of data needed to be stored and the size of the one or more blocks of the device. The data to be stored in the one or more blocks may be related such that all of the data is to be deleted from the device at the same time.

The file system or virtualization system may send to the device a request for one or more stream identifiers. Each of the stream identifiers may be associated with a given stream of the device. The stream may comprise one or more of the blocks of the device as determined by the file system or virtualization system. The request for the one or more stream identifiers may comprise an indication of the number of blocks required to store the data.

The file system or virtualization system may receive from the device the one or more stream identifiers. The device may be configured to determine one or more stream identifiers based on the number of erase blocks requested by the file system or virtualization system.

The file system or virtualization system may send to the device a request to write data to the stream. The device, upon receiving the request from the file system, may be configured to write the data to the one or more blocks in the stream. The file system or virtualization system and the device may communicate using the one or more stream identifiers. It may not be necessary for the file system to know the LBA location of the blocks on the device. In one example, the request to write data to the stream may comprise an append operation to the last (e.g., most recent) write operation in the stream.

The file system or virtualization system may receive from the device an indication of whether the data was written to the stream. For example, the file system may receive an indication that all of the data was written to the stream. The file system may receive an indication that none of the data was written to the stream. The file system may receive an indication that only a portion of the data was written to the stream.

Figure 4:
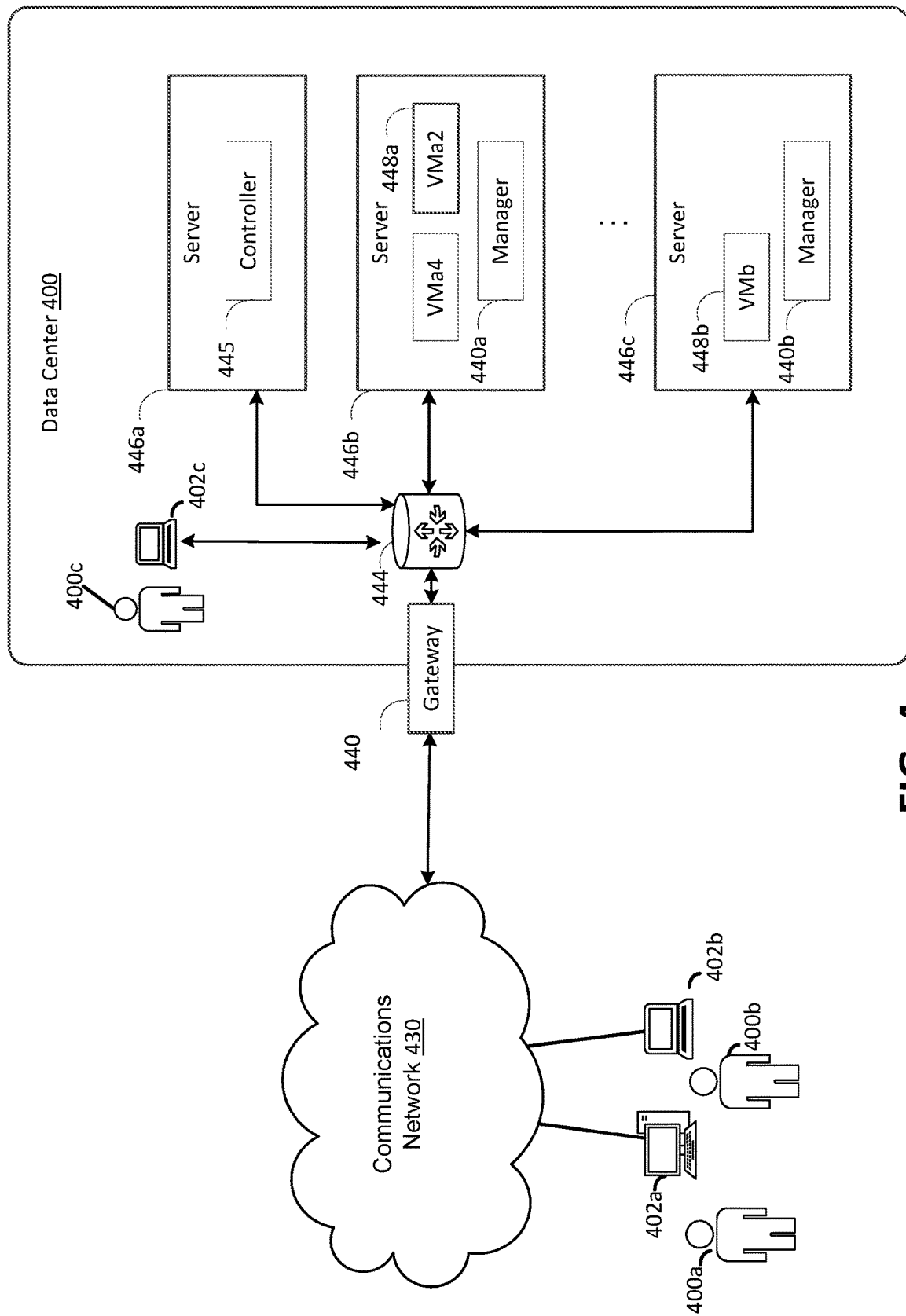
FIG. 4 is another example diagram depicting a system where aspects of the present disclosure may be implemented.

FIG. 4 illustrates an example computing environment in which the embodiments described herein may be implemented. FIG. 4 illustrates a data center 400 that configured to provide computing resources to users 400a, 400b, or 400c (which may be referred herein singularly as "a user 400" or in the plural as "the users 400") via user computers 402a, 402b, and 402c (which may be referred herein singularly as "a computer 402" or in the plural as "the computers 402") via a communications network 430. The computing resources provided by the data center 400 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 400 may include servers 446a, 446b, and 446c (which may be referred to herein singularly as "a server 446" or in the plural as "the servers 446") that provide computing resources available as virtual machines 448a and 448b (which may be referred to herein singularly as "a virtual machine 448" or in the plural as "the virtual machines 448"). The virtual machines 448 may be configured to execute applications such as Web servers, application servers, media servers, database servers, and the like. Other resources that may be provided include data storage resources (not shown on FIG. 4) and may include file storage devices, block storage devices, and the like. Servers 446 may also execute functions that manage and control allocation of resources in the data center, such as a controller 445. Controller 445 may be a fabric controller or another type of program configured to manage the allocation of virtual machines on servers 446.

Referring to FIG. 4, communications network 430 may, for example, be a publicly accessible network of linked networks and may be operated by various entities, such as the Internet. In other embodiments, communications network 430 may be a private network, such as a corporate network that is wholly or partially inaccessible to the public.

Communications network 430 may provide access to computers 402. Computers 402 may be computers utilized by users 400. Computer 402a, 402b or 402c may be a server, a desktop or laptop personal computer, a tablet computer, a smartphone, a set-top box, or any other computing device capable of accessing data center 400. User computer 402a or 402b may connect directly to the Internet (e.g., via a cable modem). User computer 402c may be internal to the data center 400 and may connect directly to the resources in the data center 400 via internal networks. Although only three user computers 402a, 402b, and 402c are depicted, it should be appreciated that there may be multiple user computers.

Computers 402 may also be utilized to configure aspects of the computing resources provided by data center 400. For example, data center 400 may provide a Web interface through which aspects of its operation may be configured through the use of a Web browser application program executing on user computer 402. Alternatively, a stand-alone application program executing on user computer 402 may be used to access an application programming interface (API) exposed by data center 400 for performing the configuration operations.

Servers 446 may be configured to provide the computing resources described above. One or more of the servers 446 may be configured to execute a manager 420a or 420b (which may be referred herein singularly as "a manager 420" or in the plural as "the managers 420") configured to execute the virtual machines. The managers 420 may be a virtual machine monitor (VMM), fabric controller, or another type of program configured to enable the execution of virtual machines 448 on servers 446, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 400 shown in FIG. 4, a router 444 may be utilized to interconnect the servers 446a and 446b. Router 444 may also be connected to gateway 440, which is connected to communications network 430. Router 444 may manage communications within networks in data center 400, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details.

Additional computing systems and other devices may be interconnected in other embodiments and may be interconnected in different ways.

It should be appreciated that the network topology illustrated in FIG. 4 has been greatly simplified and that many more networks and networking devices may be utilized to interconnect the various computing systems disclosed herein. These network topologies and devices should be apparent to those skilled in the art.

It should also be appreciated that data center 400 described in FIG. 4 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 5:
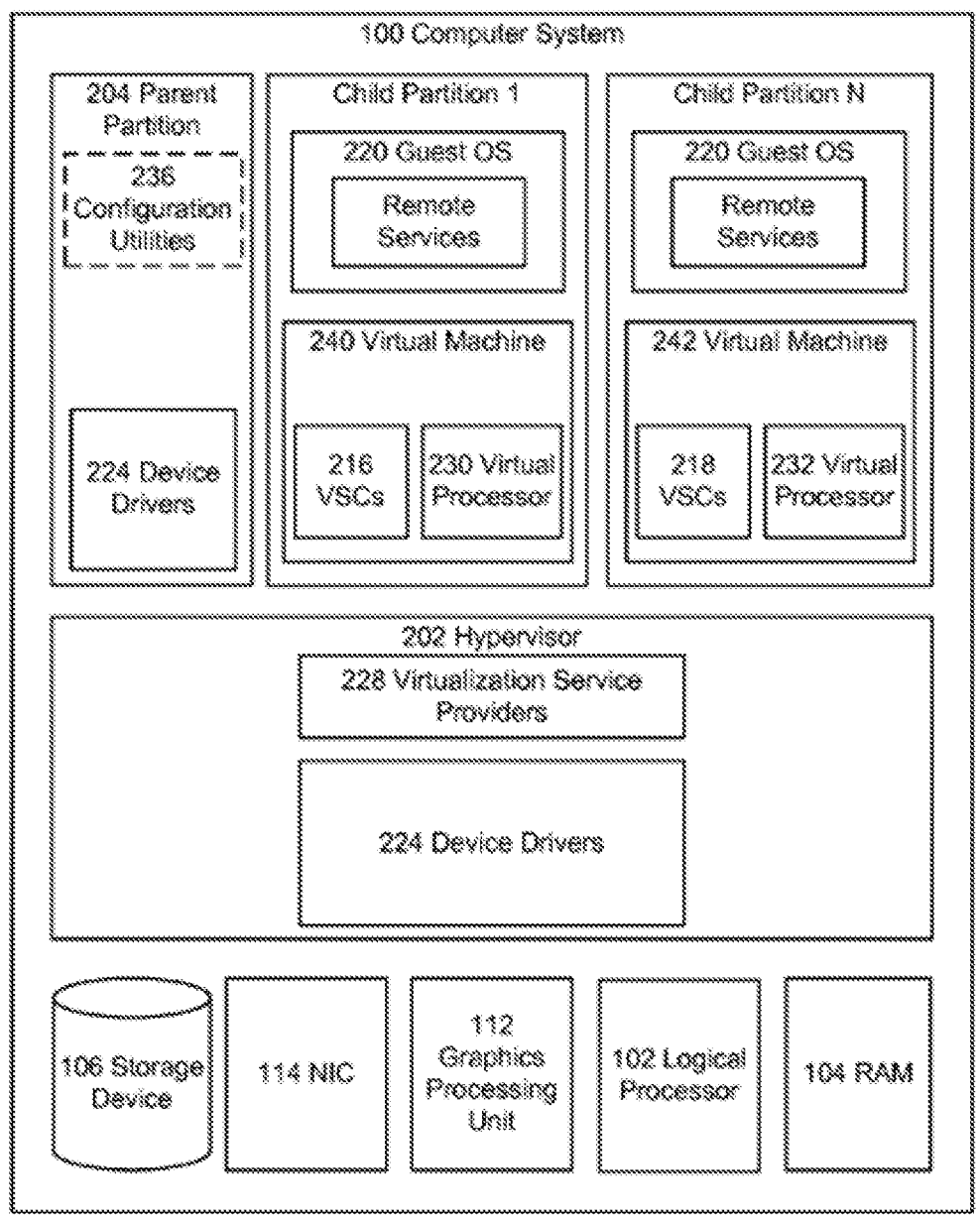
FIG. 5 is an example diagram depicting a computer system implementing virtualized services.

Referring now to FIG. 5, depicted is a high-level block diagram of a computer system configured to effectuate virtual machines. As shown in the figures, computer system 100 can include elements described in FIG. 4 and components operable to effectuate virtual machines. One such component is a hypervisor 202 that may also be referred to in the art as a virtual machine monitor. The hypervisor 202 in the depicted embodiment can be configured to control and arbitrate access to the hardware of computer system 100. Broadly stated, the hypervisor 202 can generate execution environments called partitions such as child partition 1 through child partition N (where N is an integer greater than or equal to 1). In embodiments a child partition can be considered the basic unit of isolation supported by the hypervisor 202, that is, each child partition can be mapped to a set of hardware resources, e.g., memory, devices, logical processor cycles, etc., that is under control of the hypervisor 202 and/or the parent partition and hypervisor 202 can isolate one partition from accessing another partition's resources. In embodiments the hypervisor 202 can be a stand-alone software product, a part of an operating system, embedded within firmware of the motherboard, specialized integrated circuits, or a combination thereof.

In the above example, computer system 100 includes a parent partition 204 that can also be thought of as domain 0 in the open source community. Parent partition 204 can be configured to provide resources to guest operating systems executing in child partitions 1-N by using virtualization service. Each child partition can include one or more virtual processors such as virtual processors 230 through 232 that guest operating systems 220 through 222 can manage and schedule threads to execute thereon. Generally, the virtual processors 230 through 232 are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to logical processors of the computer system such that the instructions that effectuate the virtual processors will be backed by logical processors. Thus, in these example embodiments, multiple virtual processors can be simultaneously executing while, for example, another logical processor is executing hypervisor instructions. Generally speaking, and as illustrated by the figures, the combination of virtual processors and memory in a partition can be considered a virtual machine such as virtual machine 240 or 242.

Generally, guest operating systems 220 through 222 can include any operating system such as, for example, operating systems from Microsoft®, Apple®, the open source community, etc. The guest operating systems can include user/kernel modes of operation and can have kernels that can include schedulers, memory managers, etc. A kernel mode can include an execution mode in a logical processor that grants access to at least privileged processor instructions. Each guest operating system 220 through 222 can have associated file systems that can have applications stored thereon such as terminal servers, e-commerce servers, email servers, etc., and the guest operating systems themselves. The guest operating systems 220-222 can schedule threads to execute on the virtual processors 230-232 and instances of such applications can be effectuated.

As used herein, "storage stack" refers to an entity that may include a layering of various drivers, filters, encryption logic, antivirus logic, etc. that may be used to handle transfers/transformation of data/information from main memory to other storage. For example, for I/O requests (e.g., "read/write" requests), a block of data may be "packaged" (e.g., using a construct such as an IRP (I/O Request Packet)) and passed down the stack; thus, entities in the stack handle the transfer of that data from main memory to storage. Generally, such "I/O" operations (e.g., "read/write" operations) involve more processing time (and hence, more delay time) than traditional "load/store" operations that may occur directly between a CPU and main memory (e.g., with no "storage stack" involvement in such operations).

The term "file system" is used by way of example and the discussion of example techniques herein may also be applied to other types of file systems. In this context, a "file system" may include one or more hardware and/or software components that organize data that is persisted. For example, persisted data may be organized in units that may be referred to as "files"—and thus, a "file system" may be used to organize and otherwise manage and/or control such persisted data. For example, a "file" may be associated with a corresponding file name, file length, and file attributes. A file handle may include an indicator (e.g., a number) used by the file system to uniquely reference a particular active file.

Figure 6:
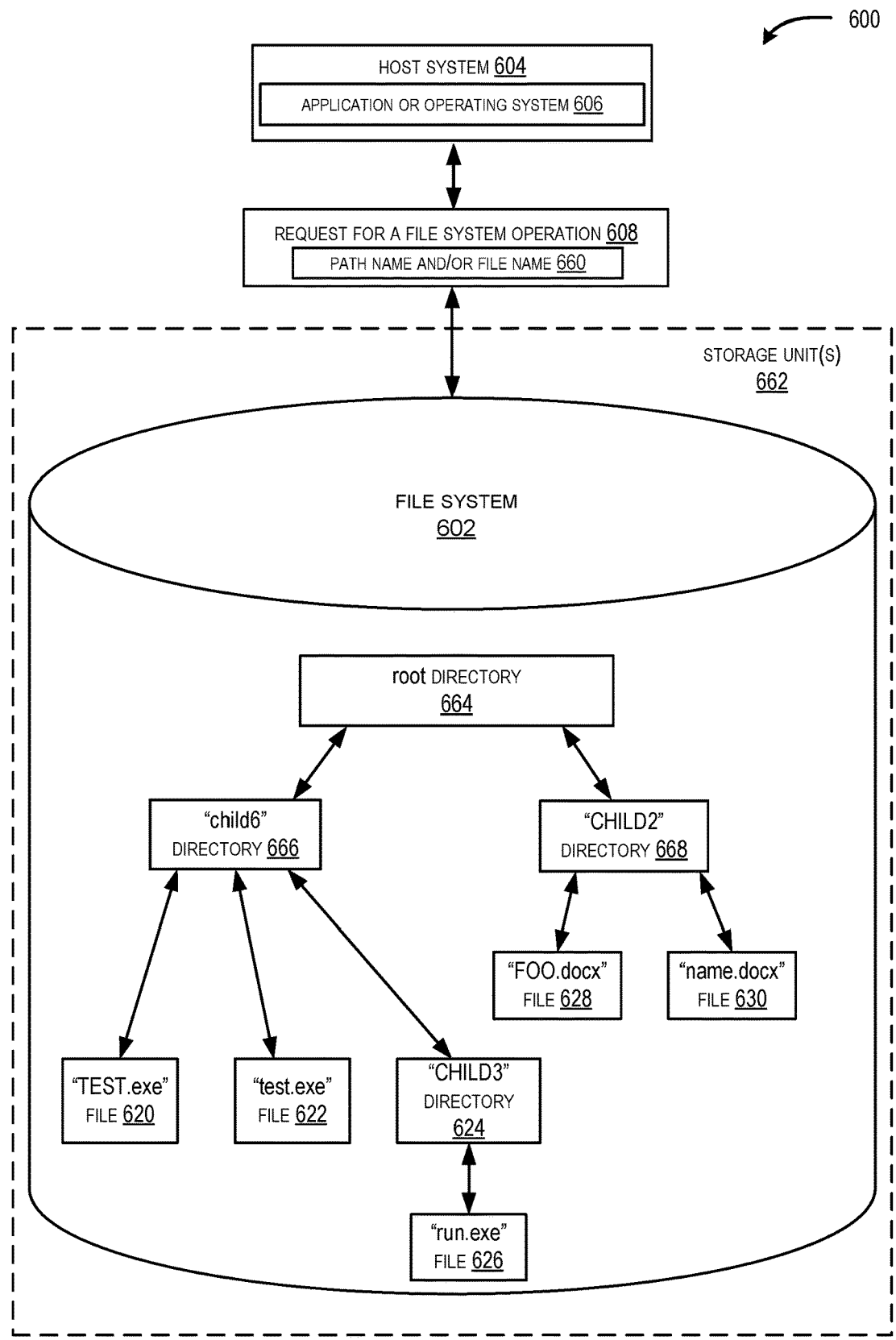
FIG. 6 is an example diagram depicting an example file system.

FIG. 6 is an example diagram 600 depicting a file system 602. In various examples, the file system 602 can support an operating system of a device. In further examples, the file system 602 can be part of a file hosting platform including, but not limited to, DROPBOX, BOX, GOOGLE DRIVE, MEGA, PCLOUD, SUGARSYNC, AMAZON DRIVE, and/or MICROSOFT ONEDRIVE. To this end, the file system 602 is configured to interact with a host system 604 (e.g., a computing device, a server, etc.). The host system 604 can include an application or an operating system 606, or some other module, that initiates a request for a file system operation 608 while being executed on the host system 604. A request for a file system operation may be referred to herein as a "request". Example file system operations include, but are not limited to: opening a file, deleting a file, writing to a file, reading from a file, replacing a file, copying a file, moving a file, searching for a file (e.g., as part of a pattern matching query), creating a file, etc.

In various examples, a file system can comprise one or more layers. For instance, a first "logical" layer of a file system is configured to control interactions with an operating system or an application of a host system. The logical layer can provide an application program interface (API) for receiving requests for file system operations and for passing the request to a "virtual" layer and/or a "physical" layer of the file system for processing. A virtual layer is an interface that supports multiple concurrent instances of a physical file system. The physical layer handles the physical operation of a storage unit (e.g., a disk). For instance, the physical layer processes physical blocks being read or written, the physical layer handles buffering and memory management, and/or the physical layer is responsible for the placement of blocks in specific locations on the storage unit. The layers described above may be separate, or their functions can be combined such that a file system is not comprised of separate layers.

The request 608 includes a path name and/or a file name 660 that identifies a file stored in the file system 602 on which to perform the requested file system operation. A path name can include components useable by the file system 602 to navigate the hierarchical structure of the file system 602 in order to search for and locate the file. As described above, an individual component in a path name can identify, for example, a host device or a network device that contains the file (e.g., a server), a hardware device such as a storage unit (e.g., a drive), a directory, a file name for the file (e.g., a base file name), and a file type (e.g., a file format or file extension). At least some of the components of a path name can reflect the hierarchical structure of the files system 602 and can be separated by a delimiting character (e.g., a slash "/", a backslash character "\", a colon ":", etc.). In some instances, reference to a "file name", as used herein, can include both a file name component and a file type component (e.g., a file name can be "run.exe").

The file system 602 can be persistently stored on storage unit(s) 662. A storage unit 662 can be a hard disk drive or a solid-state drive. Examples of a storage unit 662 include: a machine (e.g., a server), a disk, a platter, a sector, and so forth. In some instances, storage units can be arranged into a "rack" (e.g., a row) and multiple racks of storage units can be arranged into a "grid" of storage units (e.g., configured within a data center). A storage unit 662 can be local to the host system 604 (e.g., local storage) or a storage unit 662 can be remotely located such that the file system 602 is accessed by the host system 604 over a network. In various examples, one or more storage units 662 can comprise a volume or a logical drive.

An individual directory in the file system 602 can include one or more files and/or one or more directories. The hierarchical structure of the directories and/or files illustrated in FIG. 6 is provided for ease of discussion with respect to the various examples described herein.

Figure 7A:
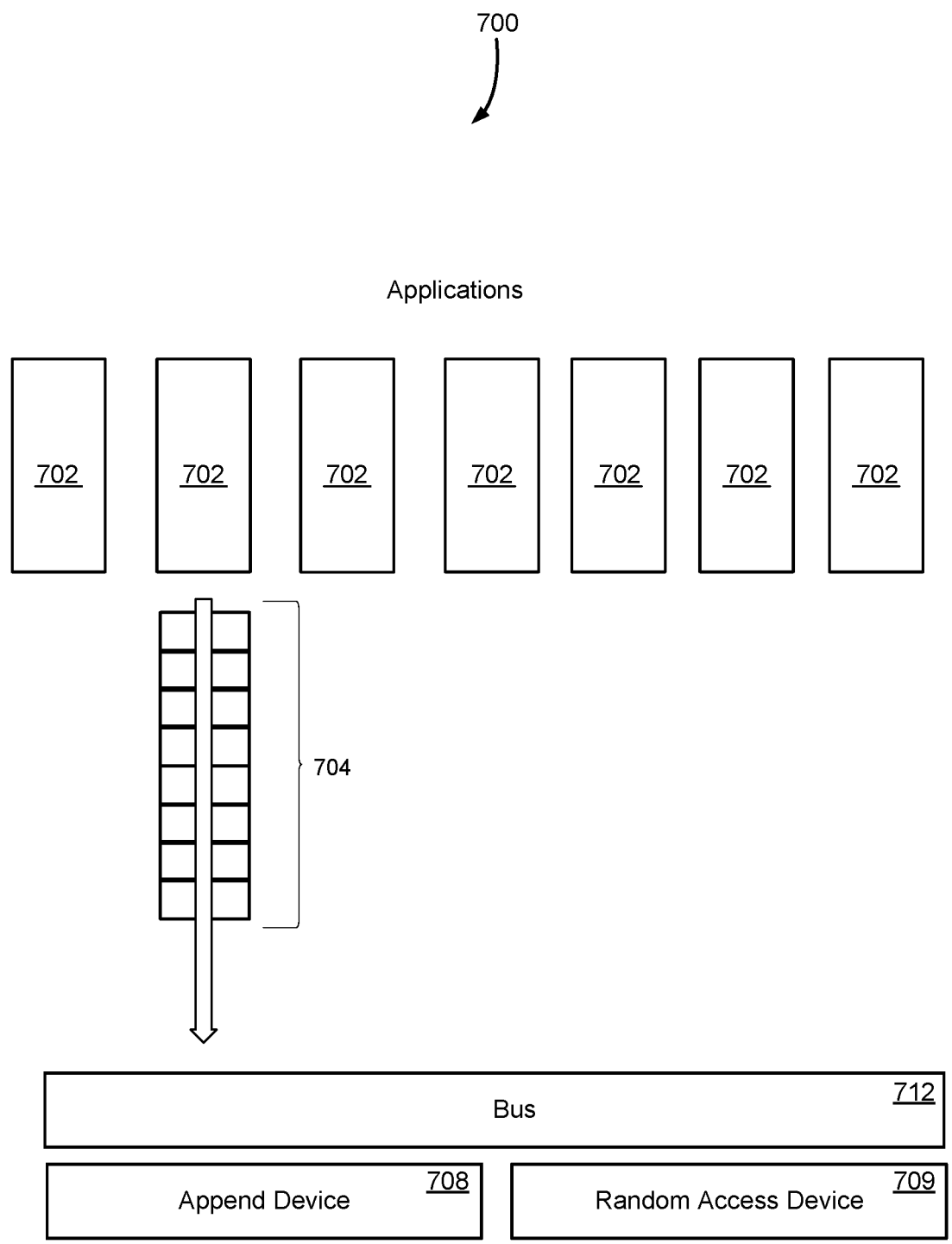
FIG. 7A is an example diagram a storage stack and storage devices in accordance with the present disclosure.

Referring to FIG. 7A, illustrated is a computing environment 700 that may be viewed as a collection of shared computing resources and shared infrastructure. The computing environment may include a number of applications 702 that are running in the computing environment 700. For example, the computing environment 700 may be a virtualized computing environment may include virtual machine containers. The virtual machine containers may be hosted on physical hosts that may vary in hardware and/or software configurations. Each container may be capable of hosting a virtual machine.

Computing environment 700 may also include one or more routers (not shown on FIG. 7) which may service multiple physical hosts to route network traffic. A controller or provisioning server (not shown in FIG. 7A) may include a memory and processor configured with instructions to manage workflows for provisioning and de-provisioning computing resources as well as detecting accessing storage resources. As shown in FIG. 7, an application 702 may access a bus 712 to read or write data to append device 708 or random access device 709. The random access device 709 may comprise, for example, an SSD. In order to do so, services provided by stack 704 comprising a number of layers are traversed such as file system, storage, and other stack layers. As discussed, the application of the described techniques is illustrated in the context of virtualized services but are not limited to virtualized services. Any application that accesses or otherwise utilizes storage devices and services may implement the described techniques.

The applications 702 may be configured to read and write files to the devices 708 and 709 by communicating with the storage stack 704, and the storage stack 704 may, in turn, communicate with the storage drivers (not shown in FIG. 7). The applications 702 may instruct the storage stack 704 which ID to associate with a given file. The storage stack 704 may be configured to expose an application programming interface (API) (not shown in FIG. 7) to the applications 702.

Figure 7B:
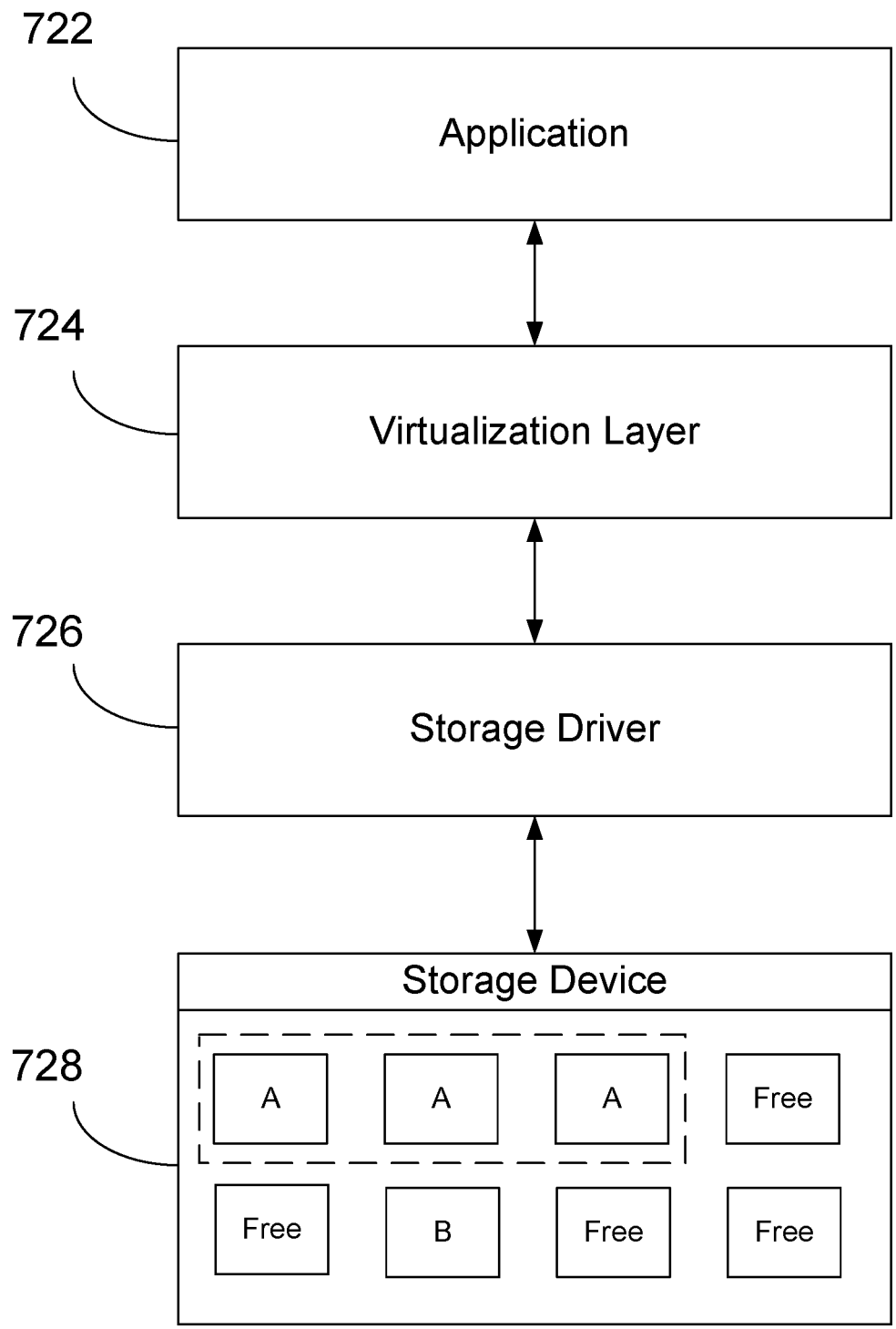
FIG. 7B is an example diagram a storage stack and storage devices in accordance with the present disclosure.

FIG. 7B is a block diagram illustrating example components of an architecture for implementing at least some of the functionality disclosed herein. As shown, in one embodiment, the architecture may comprise an application 722, a virtualization layer 724, a storage driver 726, and a storage device 728.

The application 722 may be configured to read and write files to the device 728 by communicating with the virtualization layer 724. The virtualization layer 724 may be configured to abstract details of the storage device 728 and the storage driver 726. In order to append data, the application 722 may instruct the virtualization layer 724 an identifier of a file or data. The virtualization layer 724 may determine which ID to associate with the file or data.

In some embodiments, the virtualization layer 724 may be configured to expose an application programming interface (API) to the application 722. For example, the application 722, via an API provided by the virtualization layer 724, may be configured to request that a file or data be stored using an append-only storage scheme. The virtualization layer 724 may tag the file or data with a particular ID. The virtualization layer 724 may be further configured to store metadata associated with each file of the device 728, and to further store the particular ID associated with each file along with the file metadata.

The storage driver 726 may be configured to expose an API to the virtualization layer 724. For example, the virtualization layer 724, via an API provided by the storage driver 726, may be configured to enable read/write functionality on the storage device 728. The virtualization layer 724, via an API provided by the storage driver 726, may be further configured to discover existing stored data on the device 728. The virtualization layer 724, via an API provided by the storage driver 726, may be further configured to obtain information from the device such as, for example, the ability of the device to support append-only storage schemes. The virtualization layer 724 may be configured to communicate with the storage driver 726 and to expose device agnostic interfaces to the application 722 so that the virtualization layer 724 may communicate with the storage driver 726 without the application 722 knowing the details of the particular device.

The device 728 may comprise, for example, an SSD. The SSD illustrated in FIG. 7B, for example, comprises eight erase blocks. Data may be written individually to a given block or may be striped across a plurality of the blocks in order to maximize throughput on the SSD.

The virtualization layer 724 may access data indicative of space allocation for the device 728 as well as policies for prioritizing performance of storage network. Based on the data and policies, the virtualization layer 724 may select a physical storage location at the device 728. The virtualization layer 724 may generate metadata for a data object indicating that the data object is an append-only object and mapping the physical storage location of the data object to the identifier. The virtualization layer 724 may translate a storage request to one or more instructions for storing the data object at the physical storage location using an append-only storage scheme. The virtualization layer 724 may cause the data object to be stored at the physical storage location using the append-only storage scheme.

Figure 8:
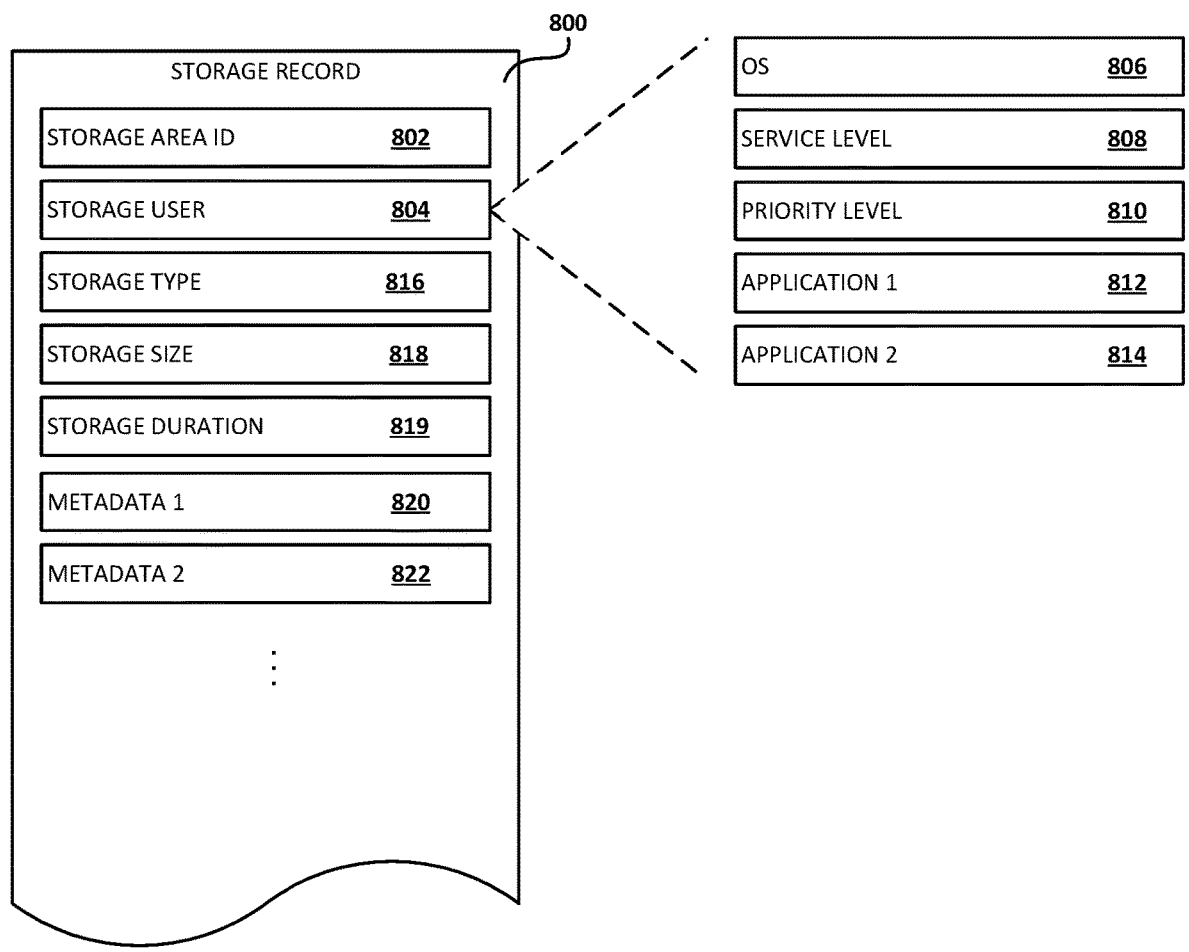
FIG. 8 illustrates a diagram depicting an example data structure in accordance with the present disclosure.

FIG. 8 is a data structure diagram showing a number of data elements stored in a storage record 800 storing metadata for an append only storage service. It will be appreciated by one skilled in the art that the data structure shown in the figure may represent a data file, a database table, an object stored in a computer storage, a programmatic structure or any other data container commonly known in the art. Each data element included in the data structure may represent one or more fields in a data file, one or more columns of a database table, one or more attributes of an object, one or more variables of a programmatic structure or any other unit of data of a data structure commonly known in the art.

Each storage record 800 may contain a storage area ID 802 identifying the storage area or zone for whom the storage record 800 is created. According to one embodiment, each storage record 800 may also contain a storage user field 804 identifying the various functions or users who are allowed to use the storage service. In one example, the storage user field 804 may include OS version 806, service level 808, priority level 810, application 1 812, application 2 814, and the like. The storage record 800 may also contain storage type 816 indicating, for example, if the storage is random access or append only.

The storage record 800 may also contain information regarding a storage size 818. The storage record 800 may contain a storage size 819 indicating, for example, the length of time that the file should be stored before deletion. The storage record 800 may further contain information regarding one or more metadata 820 and 822A-820N. It will be appreciated that the reservation record 800 may contain additional data elements beyond those shown in FIG. 8 and described above that are utilized in conjunction with reserve storage areas.

Figure 9:
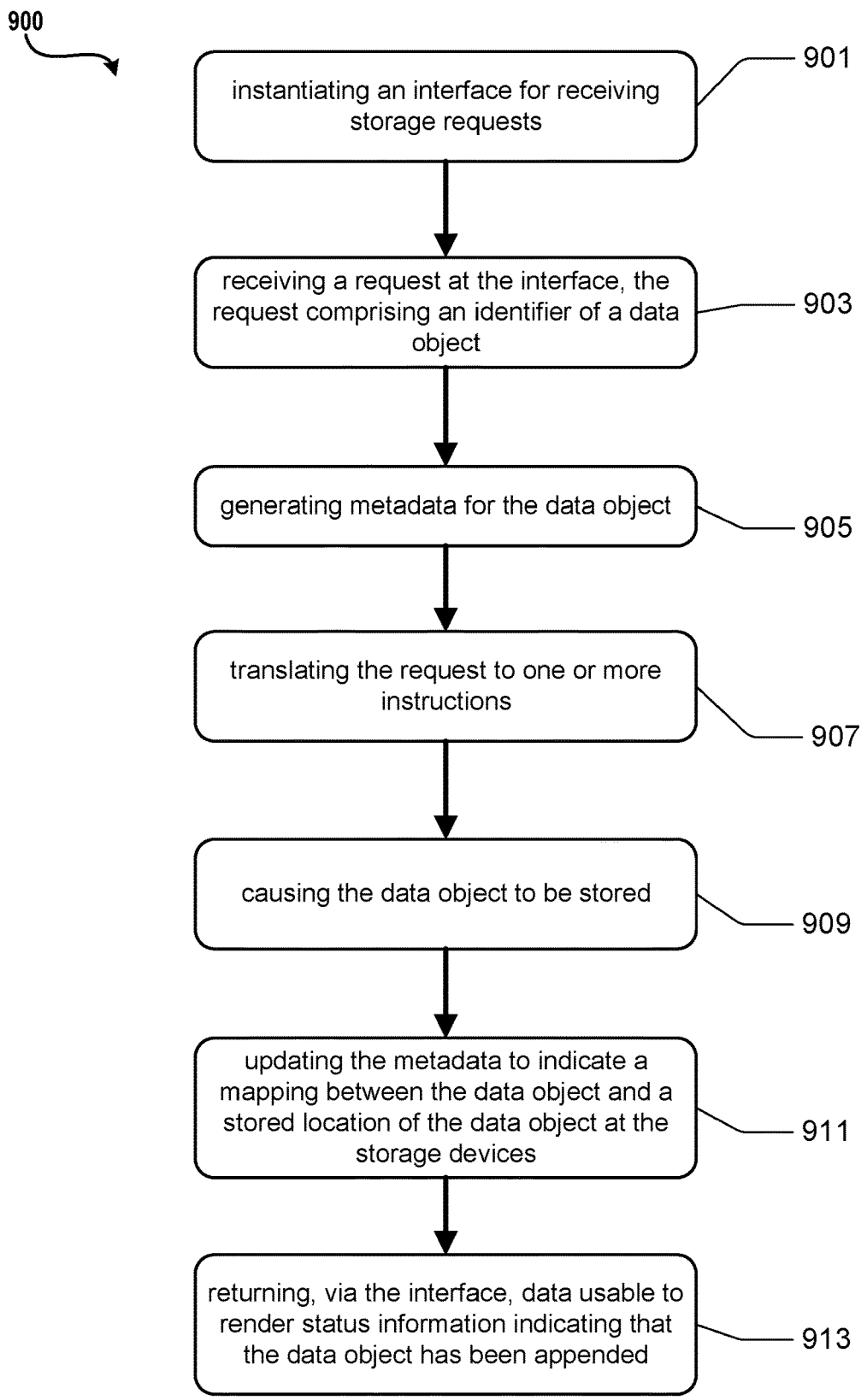
FIG. 9 is a flow diagram of an example process in accordance with the present disclosure.
Figure 10:
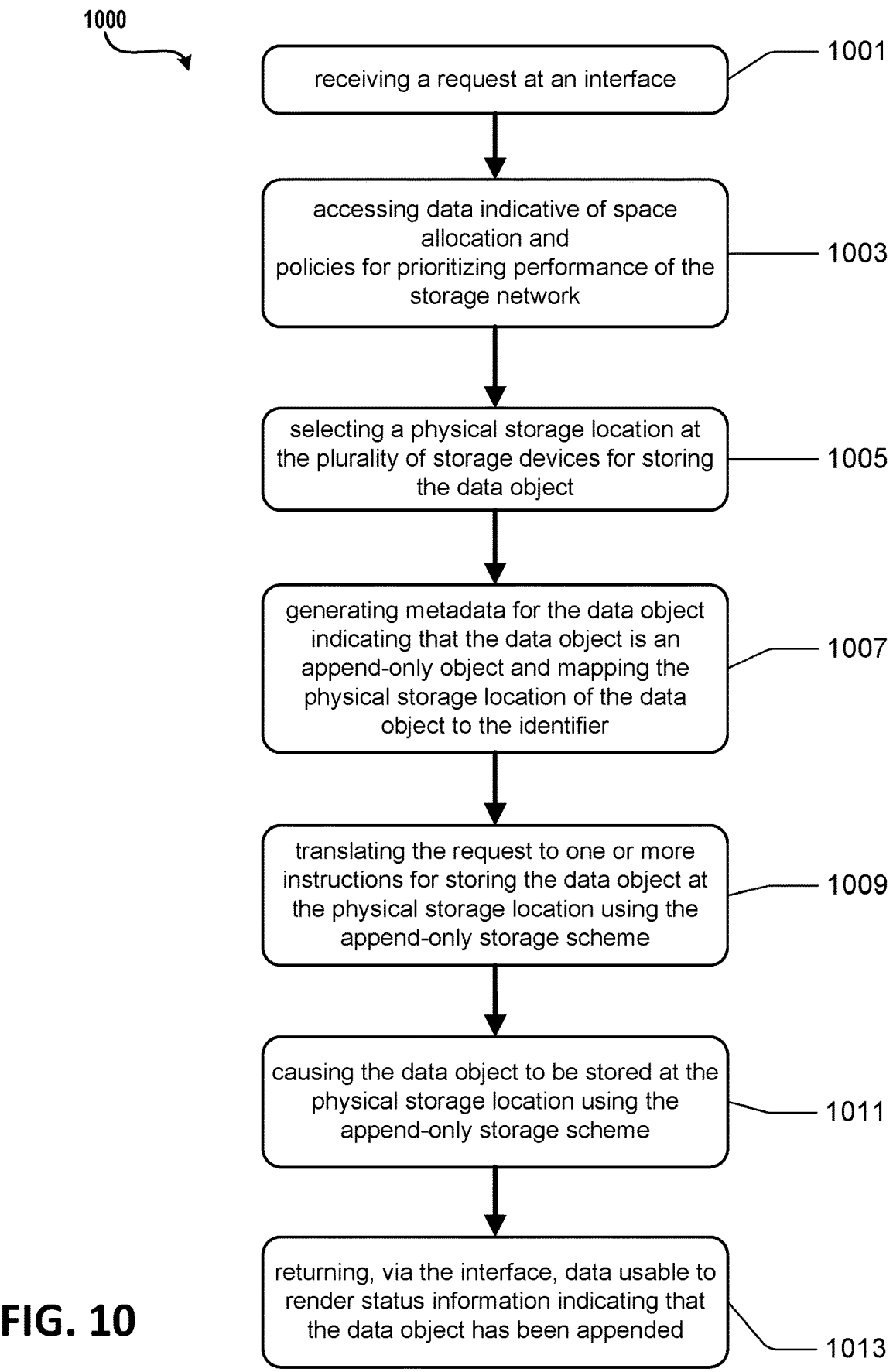
FIG. 10 is a flow diagram of an example process in accordance with the present disclosure.

Each of FIGS. 9 and 10 is a flow diagram of an example process of the techniques described herein. It should be understood by those of ordinary skill in the art that the operations of the processes disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims. Moreover, the operations can be performed in accordance with the examples provided above, with respect to any one of FIGS. 1-8.

Turning now to FIG. 9, illustrated is an example operational procedure for virtualized append-only storage requests in accordance with the present disclosure. The operational procedure may be implemented in a system comprising one or more computing devices. Referring to FIG. 9, operation 901 illustrates instantiating an interface for receiving storage requests for storing data in the software-defined storage network using an append-only storage scheme. In an embodiment, the interface is configured to receive requests that are agnostic of interfaces and hardware-specific details of the storage devices of the software-defined storage network.

Operation 901 may be followed by operation 903. Operation 903 illustrates receiving a request at the interface. In an embodiment, the request comprises an identifier of a data object to be stored in the software-defined storage network using the append-only storage scheme. In an embodiment, the request is agnostic of details of the storage devices of the software-defined storage network.

Operation 903 may be followed by operation 905. Operation 905 illustrates responsive to receiving the request at the interface, generating metadata for the data object indicating that the data object is an append-only object.

Operation 905 may be followed by operation 907. Operation 907 illustrates translating the request to one or more instructions for storing the data object in one or more of the storage devices using the append-only storage scheme.

Operation 907 may be followed by operation 909. Operation 909 illustrates causing the data object to be stored at one of the plurality of storage devices based on the instructions.

Operation 909 may be followed by operation 911. Operation 911 illustrates updating the metadata to indicate a mapping between the data object and a stored location of the data object at the storage devices.

Operation 911 may be followed by operation 913. Operation 913 illustrates returning, via the interface, data usable to render status information indicating that the data object has been appended.

Turning now to FIG. 10, illustrated is an example operational procedure for virtualized append-only storage requests in accordance with the present disclosure. The operational procedure may be implemented in a system comprising one or more computing devices. Referring to FIG. 10, operation 1001 illustrates receiving a request at an interface configured to receive storage requests for storing data in the software-defined storage network using an append-only storage scheme. In an embodiment, the requests comprise an identifier of a data object to be stored in the software-defined storage network. In an embodiment, the requests are agnostic of interfaces and hardware-specific details of the storage devices of the software-defined storage network.

Operation 1001 may be followed by operation 1003. Operation 1003 illustrates responsive to receiving the request at the interface, accessing by a virtualization layer of the software-defined storage network:

data indicative of space allocation for the plurality of storage devices; and policies for prioritizing performance of the software-defined storage network.

Operation 1003 may be followed by operation 1005. Operation 1005 illustrates based on the data and policies, selecting a physical storage location at the plurality of storage devices for storing the data object.

Operation 1005 may be followed by operation 1007. Operation 1007 illustrates generating metadata for the data object indicating that the data object is an append-only object and mapping the physical storage location of the data object to the identifier.

Operation 1007 may be followed by operation 1009. Operation 1009 illustrates translating the request to one or more instructions for storing the data object at the physical storage location using the append-only storage scheme.

Operation 1009 may be followed by operation 1011. Operation 1011 illustrates causing the data object to be stored at the physical storage location using the append-only storage scheme.

Operation 1011 may be followed by operation 1013. Operation 1013 illustrates returning, via the interface, data usable to render status information indicating that the data object has been appended.

Figure 11:
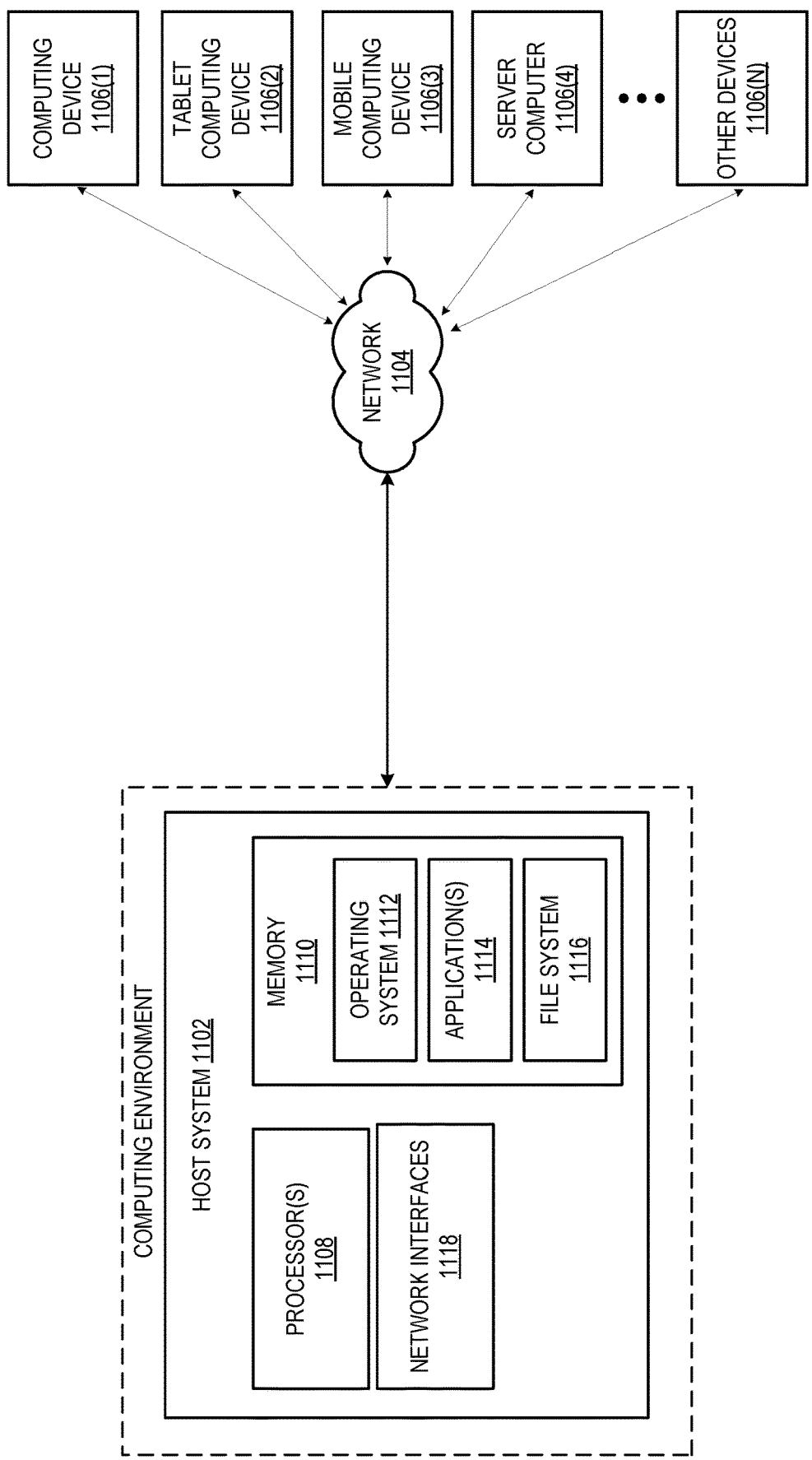
FIG. 11 illustrates an example computing environment capable of executing the techniques and processes described herein.

FIG. 11 illustrates an example computing environment capable of executing the techniques and processes described above with respect to FIGS. 1-10. In various examples, the computing environment comprises a host system 1102. In various examples, the host system 1102 operates on, in communication with, or as part of a network 1104.

The network 1104 can be or can include various access networks. For example, one or more client devices 1106(1) . . . 1106(N) can communicate with the host system 1102 via the network 1104 and/or other connections. The host system 1102 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 1102 can be provided by one or more servers that are executing as part of, or in communication with, the network 1104. A server can host various services, virtual machines, portals, and/or other resources. For example, a can host or provide access to one or more portals, Web sites, and/or other information.

The host system 1102 can include processor(s) 1208 memory 1110. The memory 1110 can comprise an operating system 1112, application(s) 1114, and/or a file system 1116 (e.g., file system 102 along with its cache 802). Moreover, the memory 1110 can comprise the storage unit(s) 112 described above with respect to FIGS. 1-9.

The processor(s) 1108 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 1110.

The memory 1110 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 1102 can communicate over the network 1104 via network interfaces 1118. The network interfaces 1118 can include various types of network hardware and software for supporting communications between two or more devices.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

EXAMPLE CLAUSES

The disclosure presented herein encompasses the subject matter set forth in the following example clauses.

Example Clause A, a computer-implemented method for storing data using an append-only storage scheme in a software-defined storage network comprising a plurality of storage devices, wherein the plurality of storage devices comprise at least one append-only storage device or random-access storage device, the method comprising:

instantiating an interface for receiving storage requests for storing data in the software-defined storage network using an append-only storage scheme, wherein the interface is configured to receive requests that are agnostic of interfaces and hardware-specific details of the storage devices of the software-defined storage network;

receiving a request at the interface, the request comprising an identifier of a data object to be stored in the software-defined storage network using the append-only storage scheme, wherein the request is agnostic of details of the storage devices of the software-defined storage network;

responsive to receiving the request at the interface:
  generating metadata for the data object indicating that the data object is an append-only object;
  translating the request to one or more instructions for storing the data object in one or more of the storage devices using the append-only storage scheme;
  causing the data object to be stored at one of the plurality of storage devices based on the instructions; and
  updating the metadata to indicate a mapping between the data object and a stored location of the data object at the storage devices; and
  returning, via the interface, data usable to render status information indicating that the data object has been appended.

Example Clause B, the computer-implemented method of Example Clause A, wherein:
  the interface is configured to render a user interface for receiving the requests for storage of the data object; and
  the user interface is configured to receive an identifier for the data object and an indication that the data object is to be stored in an append-only format.

Example Clause C, the computer-implemented method of any one of Example Clauses A through B, further comprising tagging the data object with metadata indicating storage properties and constraints for the data object, wherein the storage properties and constraints are enforced by a file system or virtualization system.

Example Clause D, the computer-implemented method of any one of Example Clauses A through C, further comprising determining instructions for storing the data object in accordance with its metadata based on the storage device where the data object is stored.

Example Clause E, the computer-implemented method of any one of Example Clauses A through D, wherein the data usable to render status information comprises data indicating a stored status of the data object while abstracting details of the storage device and indicates that the data object is available for retrieval but not editing.

Example Clause F, the computer-implemented method of any one of Example Clauses A through E, wherein an option is provided for converting the storage type from append-only to full access storage.

Example Clause G, the computer-implemented method of any one of Example Clauses A through F, further comprising providing an option for a maximum total size for appended data associated with a user, wherein data append requests for data that cause the maximum total size to be exceeded results in oldest data being deleted to allow the data object to be stored.

Example Clause H, the computer-implemented method of any one of Example Clauses A through G, further comprising providing an option for a total size for appended data associated with a user to be trimmed, wherein stored data associated with the user is deleted in accordance with one or more criteria.

Example Clause I, the computer-implemented method of any one of Example Clauses A through H, wherein the plurality of storage devices comprise all append-only storage devices, all random-access storage devices, or a combination of append-only and random-access storage devices.

While Example Clauses A through I are described above with respect to a computer-implemented method, it is understood in the context of this disclosure that the subject matter of Example Clauses A through I can additionally or alternatively be implemented by a system or device or computer readable medium.

Example Clause J, system comprising:
  one or more data processing units; and
  a computer-readable medium having encoded thereon computer-executable instructions to cause the one or more data processing units to perform operations comprising:
    receiving a request at an interface configured to receive append-only storage requests in a software-defined storage network comprising a plurality of storage devices comprising at least one append-only storage device or random-access storage device, wherein the requests are agnostic of interfaces and hardware-specific details of the plurality of storage devices, the requests comprising an identifier of a data object to be stored in the software-defined storage network using an append-only storage scheme;
    responsive to receiving the request, generating metadata for the data object indicating the data object as an append-only object and causing the data object to be stored at one of the plurality of storage devices, wherein a virtualization layer abstracts the append-only storage scheme from the interfaces and hardware-specific details of underlying append-only storage devices and random-access storage devices; and
    returning, via the interface, data usable to render status information indicating that the data object has been appended.

Example Clause K, the system of Example Clause J wherein the interface comprises a graphical user interface for receiving requests for storage of the data object.

Example Clause L, the system of any one of Example Clauses I through K, wherein the graphical user interface is configured to receive an identifier for the data object and an indication that the data object is to be stored in an append-only format.

Example Clause M, the system of any one of Example Clauses I through L, further comprising updating the metadata to indicate storage properties and constraints.

While Example Clauses I through M are described above with respect to a system, it is understood in the context of this disclosure that the subject matter of Example Clauses I through M can additionally or alternatively be implemented by a device3 or method or computer readable medium.

Example Clause N, a computer-readable medium having encoded thereon computer-executable instructions that, when executed, cause one or more processing units of a computing device to execute a method comprising:
  instantiating an interface configured to receive append-only storage requests in a software-defined storage network at least one append-only storage device or random-access storage, device, the interface wherein the append-only storage requests are agnostic of interfaces and hardware-specific details of underlying append-only storage devices and random-access storage devices;
  receiving a request at the interface, the request comprising an identifier of a data object to be stored at the software-defined storage network using an append-only storage scheme;
  responsive to receiving the request at the interface, translating the request to one or more instructions for storing the data object in one or more of the storage devices using the append-only storage scheme;

generating metadata for the data object as an append-only object and causing the data object to be stored at the software-defined storage network using the instructions; and returning, via the interface, data usable to render status information indicating that the data object has been appended at the software-defined storage network.

Example Clause O, the computer-readable medium of Example Clause N, wherein the interface is a graphical user interface configured to receive requests for append-only storage of the data object without inputting a storage address or offset.

Example Clause P, the computer-readable medium of any one of Example Clauses N through O, wherein a storage device is selected for storing the data object with append-only properties, regardless of whether the selected storage device is an append-only device or a random-access device.

Example Clause Q, the computer-readable medium of any one of Example Clauses N through P, wherein the method further comprises tagging the data object with metadata indicating storage properties and constraints.

Example Clause R, the computer-readable medium of any one of Example Clauses N through Q, wherein the storage properties and constraints are enforced by a file system or virtualization system.

Example Clause S, the computer-readable medium of any one of Example Clauses N through R, wherein the data object is stored in accordance with its metadata regardless of the storage device where the data object is stored.

Example Clause T, the computer-readable medium of any one of Example Clauses N through S, wherein the data usable to render status information comprises data indicating a stored status of the data object while abstracting details of the storage device.

While Example Clauses N through T are described above with respect to a computer-readable medium, it is understood in the context of this disclosure that the subject matter of Example Clauses N through T can additionally or alternatively be implemented by a method or via a device or via a system.

The disclosure presented herein encompasses the subject matter set forth in the following example clauses.

Example Clause AA, a computer-implemented method for storing data using an append-only storage scheme in a software-defined storage network comprising a plurality of storage devices, wherein the plurality of storage devices comprise at least one append-only storage device or random-access storage device, the method comprising:

receiving a request at an interface configured to receive storage requests for storing data in the software-defined storage network using an append-only storage scheme, the requests comprising an identifier of a data object to be stored in the software-defined storage network, wherein the requests are agnostic of interfaces and hardware-specific details of the storage devices of the software-defined storage network;

responsive to receiving the request at the interface, accessing by a virtualization layer of the software-defined storage network:

data indicative of space allocation for the plurality of storage devices;

and policies for prioritizing performance of the software-defined storage network;

based on the data and policies, selecting a physical storage location at the plurality of storage devices for storing the data object;

generating metadata for the data object indicating that the data object is an append-only object and mapping the physical storage location of the data object to the identifier;

translating the request to one or more instructions for storing the data object at the physical storage location using the append-only storage scheme;

causing the data object to be stored at the physical storage location using the append-only storage scheme; and returning, via the interface, data usable to render status information indicating that the data object has been appended.

Example Clause BB, the system of Example Clause AA wherein the plurality of storage devices comprise all append-only storage devices, all random-access storage devices, or a combination of append-only and random-access storage devices.

Example Clause CC, the system of any one of Example Clauses AA through BB, further comprising providing an option for a maximum total size for appended data associated with a user, wherein data append requests for data that cause the maximum total size to be exceeded results in oldest data being deleted to allow the data object to be stored.

Example Clause DD, the system of any one of Example Clauses AA through CC, further comprising providing an option for a total size for appended data associated with a user to be trimmed, wherein stored data associated with the user is deleted in accordance with one or more criteria.

Example Clause EE, the system of any one of Example Clauses AA through DD, wherein:

the interface is configured to render a user interface for receiving requests for storage of the data object that abstracts details of underlying storage devices, and without inputs indicating a storage address or offset; and the user interface is configured to receive an identifier for the data object and an indication that the data object is to be stored in an append-only format.

Example Clause FF, the system of any one of Example Clauses AA through EE, further comprising, based on the data indicative of space allocation, determining current allocations and availability of the storage devices.

Example Clause GG, the system of any one of Example Clauses AA through FF, further comprising, based on the policies, prioritizing throughput and latency of the software-defined storage network.

Example Clause HH, the system of any one of Example Clauses AA through GG, further comprising selecting a storage device for storing the data object with append-only properties, regardless of whether the selected storage device is an append-only device or a random-access device.

Example Clause II, the system of any one of Example Clauses AA through HH, further comprising tagging the data object with metadata indicating storage properties and constraints; wherein:

the storage properties and constraints are enforced by a file system or virtualization system; and the data object is stored in accordance with its metadata regardless of the storage device where the data object is stored.

While Example Clauses AA through II are described above with respect to a system, it is understood in the context of this disclosure that the subject matter of Example Clauses AA through II can additionally or alternatively be implemented by a method or device.

Example Clause JJ, a system comprising:
one or more data processing units; and
a computer-readable medium having encoded thereon computer-executable instructions to cause the one or more data processing units to perform operations comprising:
instantiating an interface for receiving storage requests for storing data in a software-defined storage network using an append-only storage scheme, the storage network comprising a plurality of storage devices including at least one append-only storage device or random-access storage device;
responsive to receiving a request at the interface, the request comprising an identifier of a data object to be stored in the software-defined storage network, wherein the request is agnostic of interfaces and hardware-specific details of the storage devices of the software-defined storage, accessing:
data indicative of space allocation for the plurality of storage devices;
and
policies for prioritizing performance of the storage network;
based on the data and policies, selecting a physical location at the plurality of storage devices for storing the data object;
generating metadata for the data object indicating that the data object is an append-only object;
translating the request to one or more instructions for storing the data object at the physical storage location using the append-only storage scheme; an
causing the data object to be stored at the physical storage location using a virtualized append-only storage scheme that is abstracted on top of the storage devices of the software-defined storage network; and
returning, via the interface, data usable to render status information indicating that the data object has been appended.

Example Clause KK, the system of Example Clause JJ wherein the data usable to render status information comprises data indicating a stored status of the data object while abstracting details of the storage devices.

Example Clause LL, the system of any one of Example Clauses II through KK, further comprising receiving a request to remove an append-only restriction and provide full access services for the stored data object.

Example Clause MM, the system of any one of Example Clauses II through LL, further comprising determining that the data object was stored as an append-only object but physically stored on a full access device, wherein the data object is not moved.

Example Clause NN, the system of any one of Example Clauses II through MM, further comprising updating the metadata to indicate that the data object is full access.

Example Clause OO, the system of any one of Example Clauses II through NN, further comprising receiving a request to add an append-only restriction to a full access services stored object.

Example Clause PP, the system of any one of Example Clauses II through NN, further comprising determining that the data object was stored as a full access object but physically stored on an append only device, wherein the data object is moved from the append only device to the random access device.

Example Clause QQ, the system of any one of Example Clauses II through PP, further comprising updating the metadata to indicate that the data object is to be stored as an append only object.

While Example Clauses JJ through PP are described above with respect to a system, it is understood in the context of this disclosure that the subject matter of Example Clauses JJ through PP can additionally or alternatively be implemented by a method or device or computer readable medium.

Example Clause RR, a computer-readable medium having encoded thereon computer-executable instructions that, when executed, cause one or more processing units of a computing device to execute a method comprising:
receiving a request at an interface configured to receive storage requests for storing data in a software-defined storage network using an append-only storage scheme, the software-defined storage network comprising a plurality of storage devices comprising at least one append-only storage device or random-access storage device, the requests comprising an identifier of a data object to be stored in the software-defined storage network, wherein the requests are agnostic of interfaces and hardware-specific details of the storage devices of the software-defined storage network;
responsive to receiving the request at the interface, accessing by a virtualization layer of the software-defined storage network:
data indicative of space allocation for the plurality of storage devices; and
policies for prioritizing performance of the software-defined storage network;
based on the data and policies, selecting a physical storage location at the plurality of storage devices for storing the data object;
generating metadata for the data object indicating that the data object is an append-only object and mapping the data object to the identifier;
translating the request to one or more instructions for storing the data object at the physical storage location using the append-only storage scheme;
causing the data object to be stored at the physical storage location using the append-only storage scheme; and
returning, via the interface, data usable to render status information indicating that the data object has been appended.

Example Clause SS, the computer-readable medium of Example Clause RR, further comprising:
receiving a request to remove an append-only restriction and provide full access services for the stored object; and
determining that the data object was stored as an append-only object but physically stored on a full access device, wherein the data object is not moved.

Example Clause TT, the computer-readable medium of any one of Example Clauses RR through SS, further comprising:
receiving a request to add an append-only restriction to a full access services stored object; and
determining that the data object was stored as a full access object but physically stored on an append only device, wherein the data object is moved from the append only device to the random access device.

While Example Clauses RR through TT are described above with respect to a computer-readable medium, it is understood in the context of this disclosure that the subject matter of Example Clauses RR through TT can additionally or alternatively be implemented by a method or via a device or via a system.

What is claimed is:

1. A computer-implemented method for storing data using an append-only storage scheme in a software-defined storage network comprising a plurality of storage devices, wherein the plurality of storage devices comprises at least one append-only storage device and at least one random-access storage device, the method comprising:
   receiving a first request comprising an identifier of a data object to be stored in the software-defined storage network using the append-only storage scheme, wherein the first request is agnostic of interfaces and hardware-specific details of the plurality of storage devices of the software-defined storage network;
   in response to receiving the first request, accessing by a virtualization layer of the software-defined storage network:
      data indicative of storage allocations for the plurality of storage devices; and
      policies for prioritizing the storage allocations for the plurality of storage devices;
   based on the data indicative of the storage allocations and the policies for prioritizing the storage allocations, selecting a physical storage location at the plurality of storage devices for storing the data object identified in the first request;
   translating, by the virtualization layer, the first request to an instruction for storing the data object at the physical storage location using the append-only storage scheme, wherein the append-only storage scheme is operable to store data in the plurality of storage devices while abstracting the interfaces and the hardware-specific details of the plurality of storage devices;
   executing the instruction to cause the data object to be stored at the physical storage location using the append-only storage scheme; and
   in response to receiving a second request to change a status of the data object from append-only to random-access:
      updating the status of the data object to indicate that the data object is a random-access data object; and
      moving the data object to a random-access storage device based on a determination that the data object that the physical storage location is on an append-only storage device.

2. The method of claim 1, further comprising providing an option for a maximum total size for appended data associated with a user, wherein data append requests for data that cause the maximum total size to be exceeded results in oldest data being deleted to allow the data object to be stored.

3. The method of claim 1, further comprising providing an option for a total size for appended data associated with a user to be trimmed, wherein stored data associated with the user is deleted in accordance with one or more criteria.

4. The method of claim 1, wherein:
   the first request is received at an interface configured to receive storage requests for storing data in the software-defined storage network using the append-only storage scheme;
   the interface is configured to render a user interface for receiving requests for storage of the data object that abstracts details of underlying storage devices, and without inputs indicating a storage address or offset; and
   the user interface is configured to receive an identifier for the data object and an indication that the data object is to be stored in an append-only format.

5. The method of claim 1, further comprising, based on the data indicative of the storage allocations, determining current allocations and availability of the storage devices.

6. The method of claim 1, further comprising, based on the policies, prioritizing throughput and latency of the software-defined storage network.

7. The method of claim 1, further comprising selecting a storage device for storing the data object with append-only properties, regardless of whether the selected storage device is an append-only device or a random-access device.

8. The method of claim 1, further comprising tagging the data object with metadata indicating storage properties and constraints; wherein:
   the storage properties and constraints are enforced by a file system or virtualization system; and
   the data object is stored in accordance with its metadata regardless of the storage device where the data object is stored.

9. A system comprising:
   one or more data processing units; and
   a computer-readable medium having encoded thereon computer-executable instructions to cause the one or more data processing units to perform operations comprising:
      receiving a first request for storing data in a software-defined storage network using an append-only storage scheme, the software-defined storage network comprising a plurality of storage devices including at least one append-only storage device and at least one random-access storage device;
      responsive to receiving the first request, the first request comprising an identifier of a data object to be stored in the software-defined storage network, wherein the request is agnostic of interfaces and hardware-specific details of the storage devices of the software-defined storage network, accessing:
         data indicative of storage allocations for the plurality of storage devices; and
         policies for prioritizing the storage allocations for the plurality of storage devices;
      based on the storage allocations and the policies for prioritizing the storage allocations, selecting a physical storage location at the plurality of storage devices for storing the data object identified in the first request;
      translating the request to an instruction for storing the data object at the physical storage location using the append-only storage scheme, wherein the append-only storage scheme is operable to store data in the plurality of storage devices while abstracting the interfaces and the hardware-specific details of the plurality of storage devices;
      executing the instruction to cause the data object to be stored at the physical storage location using the append-only storage scheme, wherein the append-only storage scheme is abstracted on top of the storage devices of the software-defined storage network; and
      in response to receiving a second request to change a status of the data object from append-only to random-access:
         updating the status of the data object to indicate that the data object is a random-access data object; and
         maintaining storage of the data object at the physical storage location based on a determination that the physical storage location is on a random-access storage device.

10. The system of claim 9, further comprising returning, via an interface, data usable to render status information indicating that the data object has been appended; wherein the data usable to render status information comprises data indicating a stored status of the data object while abstracting details of the storage devices.

11. The system of claim 9, further comprising updating metadata to indicate the status of the data object.

12. The system of claim 9, further comprising receiving a third request to add an append-only restriction to a full access services stored object.

13. A non-transitory computer-readable medium having encoded thereon computer-executable instructions that, when executed, cause one or more processing units of a computing device to execute a method comprising:
  receiving a first request for storing data in a software-defined storage network using an append-only storage scheme, the software-defined storage network comprising a plurality of storage devices comprising at least one append-only storage device and at least one random-access storage device, the first request comprising an identifier of a data object to be stored in the software-defined storage network, wherein the first request is agnostic of interfaces and hardware-specific details of the storage devices of the software-defined storage network;
  responsive to receiving the first request, accessing by a virtualization layer of the software-defined storage network:
    data indicative of storage allocations for the plurality of storage devices; and
    policies for prioritizing the storage allocations for the plurality of storage devices;
  based on the storage allocations and the policies for prioritizing the storage allocations, selecting a physical storage location at the plurality of storage devices for storing the data object identified in the first request;
  translating the request to an instruction for storing the data object at the physical storage location using the append-only storage scheme, wherein the append-only storage scheme is operable to store data in the plurality of storage devices while abstracting the interfaces and the hardware-specific details of the plurality of storage devices;
  causing the data object to be stored at the physical storage location using the append-only storage scheme; and
  in response to receiving a second request to change a status of the data object from append-only to random-access:
    updating the status of the data object to indicate that the data object is a random-access data object; and
    moving the data object to a random-access storage device based on a determination that the data object that the physical storage location is on an append-only storage device.

* * * * *